US012591563B2

(12) United States Patent
Srinivasan et al.

(10) Patent No.: US 12,591,563 B2
(45) Date of Patent: Mar. 31, 2026

(54) USING PERSISTENT MEMORY AND REMOTE DIRECT MEMORY ACCESS TO REDUCE WRITE LATENCY FOR DATABASE LOGGING

(71) Applicant: Oracle International Corporation, Redwood Shores, CA (US)

(72) Inventors: Kesavan Puliyur Srinivasan, Hudson, OH (US); Jia Shi, Campbell, CA (US); Vijay Sridharan, Santa Clara, CA (US); Zuoyu Tao, Belmont, CA (US); Shreyas Udgaonkar, Baton Rouge, LA (US)

(73) Assignee: Oracle International Corporation, Redwood Shores (CA)

( * ) Notice: Subject to any disclaimer, the term of this patent is extended or adjusted under 35 U.S.C. 154(b) by 554 days.

(21) Appl. No.: 16/948,201

(22) Filed: Sep. 8, 2020

(65) Prior Publication Data

US 2021/0073198 A1 Mar. 11, 2021

Related U.S. Application Data

(60) Provisional application No. 62/897,969, filed on Sep. 9, 2019.

(51) Int. Cl.
| | |
|---|---|
| *G06F 16/00* | (2019.01) |
| *G06F 11/1471* | (2026.01) |
| *G06F 15/173* | (2006.01) |
| *G06F 16/23* | (2019.01) |

(52) U.S. Cl.
CPC ...... *G06F 16/2358* (2019.01); *G06F 11/1471* (2013.01); *G06F 15/17331* (2013.01); *G06F 16/2379* (2019.01)

(58) Field of Classification Search
CPC ............ G06F 16/2358; G06F 16/2379; G06F 11/1471; G06F 15/17331
See application file for complete search history.

(56) References Cited

U.S. PATENT DOCUMENTS

| | | | |
|---|---|---|---|
| 6,976,022 B2 | 12/2005 | Vemuri et al. | |
| 7,373,438 B1 | 5/2008 | Debergalis et al. | |
| 8,984,170 B2 | 3/2015 | Colrain et al. | |
| 9,558,229 B2 | 1/2017 | Lee et al. | |
| 10,387,399 B1 | 8/2019 | Mckelvie et al. | |
| 2005/0203974 A1* | 9/2005 | Smith | G06F 16/2336 |
| 2016/0041885 A1* | 2/2016 | Arai | G06F 16/27 |
| | | | 707/625 |
| 2016/0092134 A1* | 3/2016 | Raitto | G06F 16/283 |
| | | | 711/170 |

(Continued)

FOREIGN PATENT DOCUMENTS

| | | | | |
|---|---|---|---|---|
| CN | 110177118 A | * | 8/2019 | H04L 67/10 |

OTHER PUBLICATIONS

Non-Final Office Action dated Jul. 2, 2020 for U.S. Appl. No. 16/163,181.

(Continued)

*Primary Examiner* — Paul Kim
(74) *Attorney, Agent, or Firm* — Vista IP Law Group, LLP

(57) ABSTRACT

Described is an approach to implement persistent memory to hold log records upon a commit for a database system. The approach may use RDMA techniques to hold change records at a remote persistent memory location.

33 Claims, 22 Drawing Sheets

(56)     References Cited

U.S. PATENT DOCUMENTS

| | | |
|---|---|---|
| 2016/0344834 A1 | 11/2016 | Das |
| 2016/0350353 A1 | 12/2016 | Li |
| 2016/0364158 A1* | 12/2016 | Narayanan .......... H04L 41/0813 |
| 2017/0034270 A1* | 2/2017 | Nagasubramaniam ...................... G06F 15/167 |
| 2019/0102087 A1* | 4/2019 | Shi ...................... G06F 12/0871 |
| 2020/0183842 A1* | 6/2020 | Kahle ..................... G06F 9/466 |

OTHER PUBLICATIONS

Final Office Action dated Dec. 4, 2020 for U.S. Appl. No. 16/163,181.

Advisory Action dated Feb. 10, 2021 for U.S. Appl. No. 16/163,181.

Notice of Allowance dated Mar. 15, 2021 for U.S. Appl. No. 16/163,181.

* cited by examiner

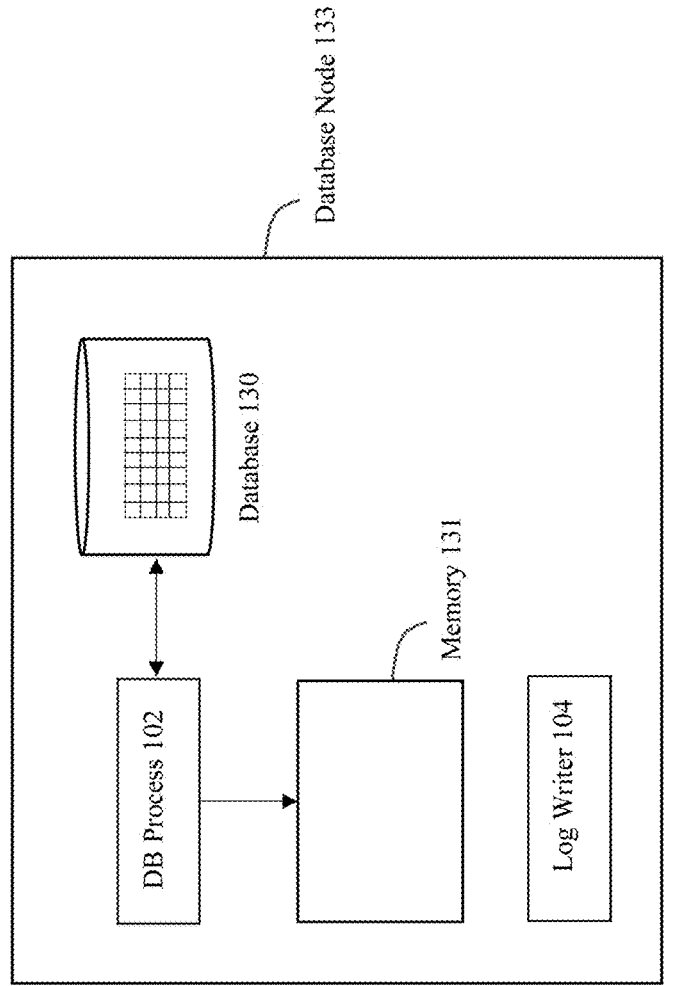
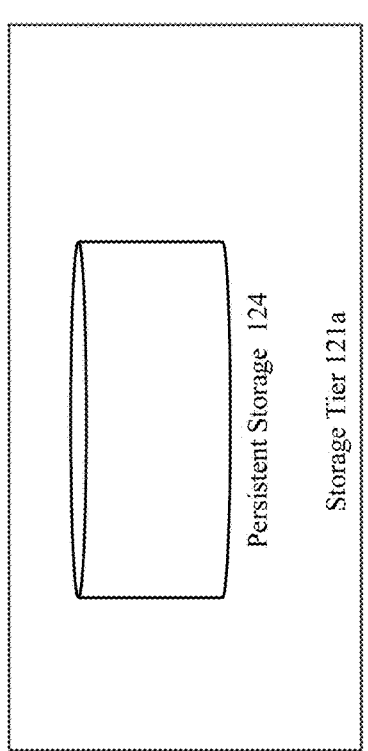
Fig. 3A

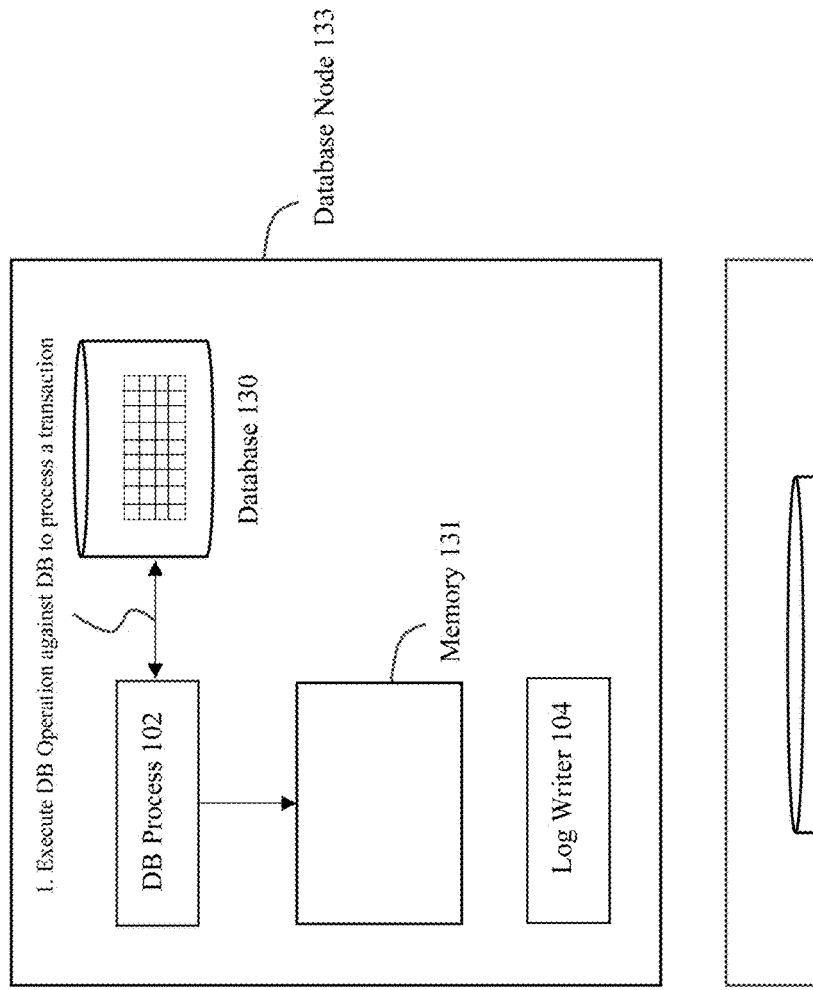
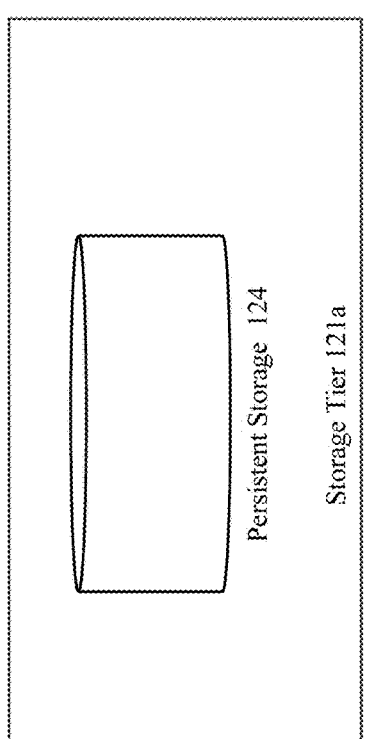
Fig. 3B

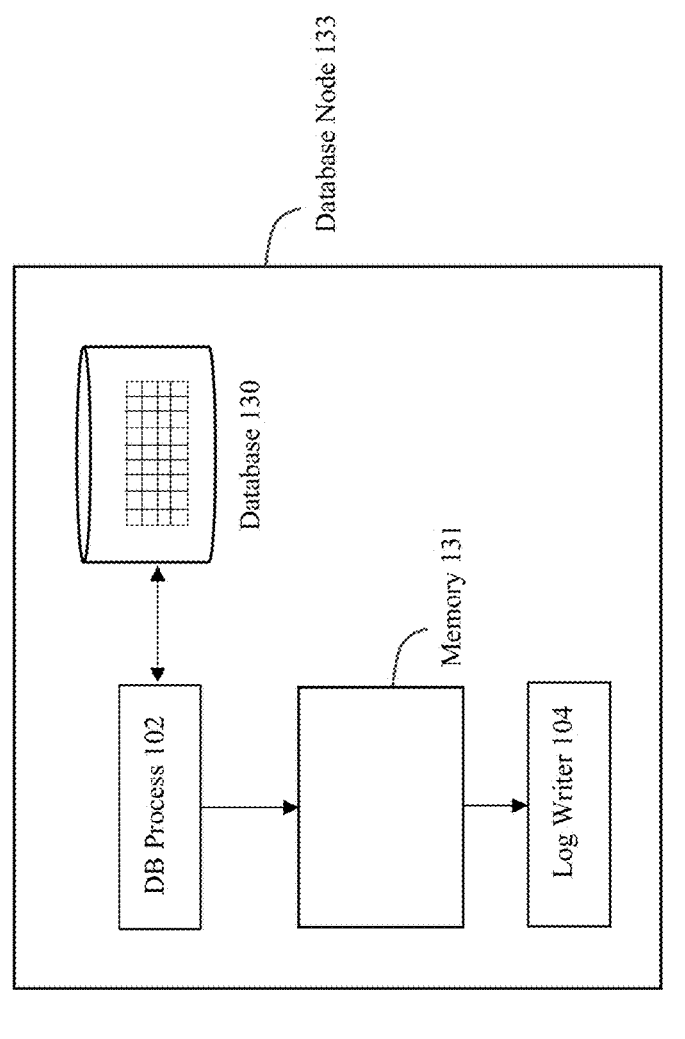
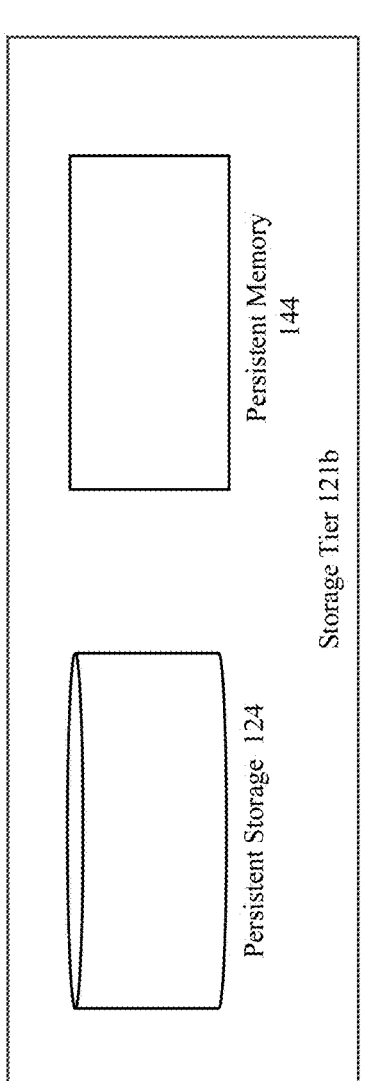
Fig. 4A

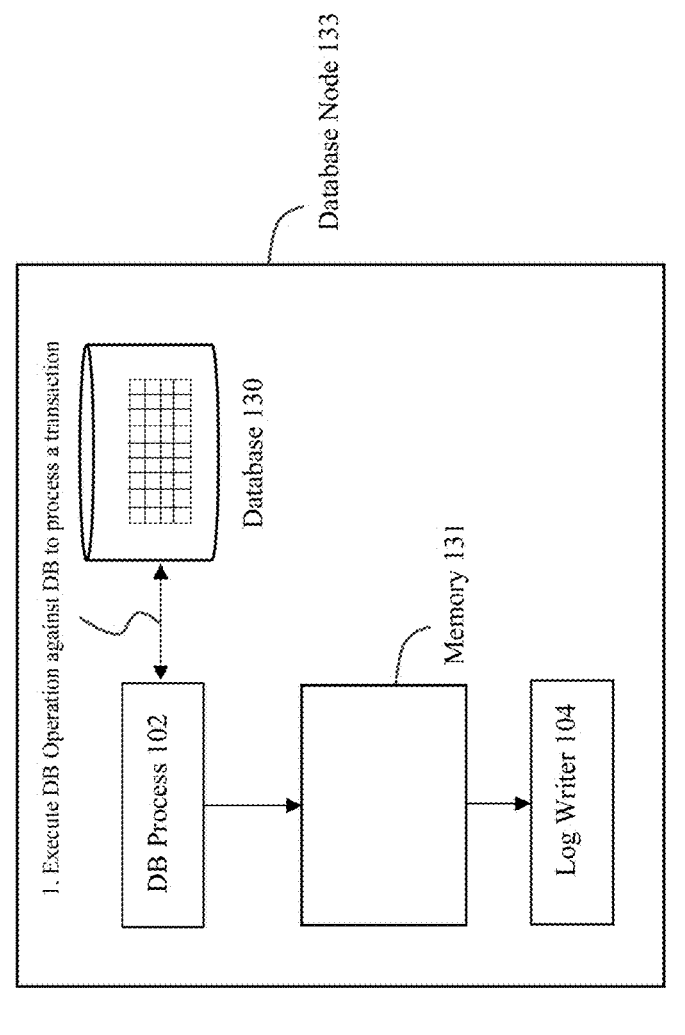
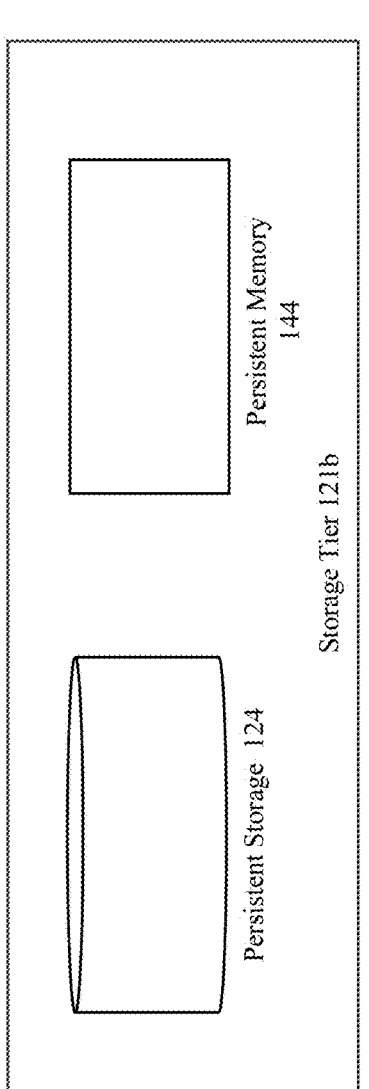
Fig. 4B

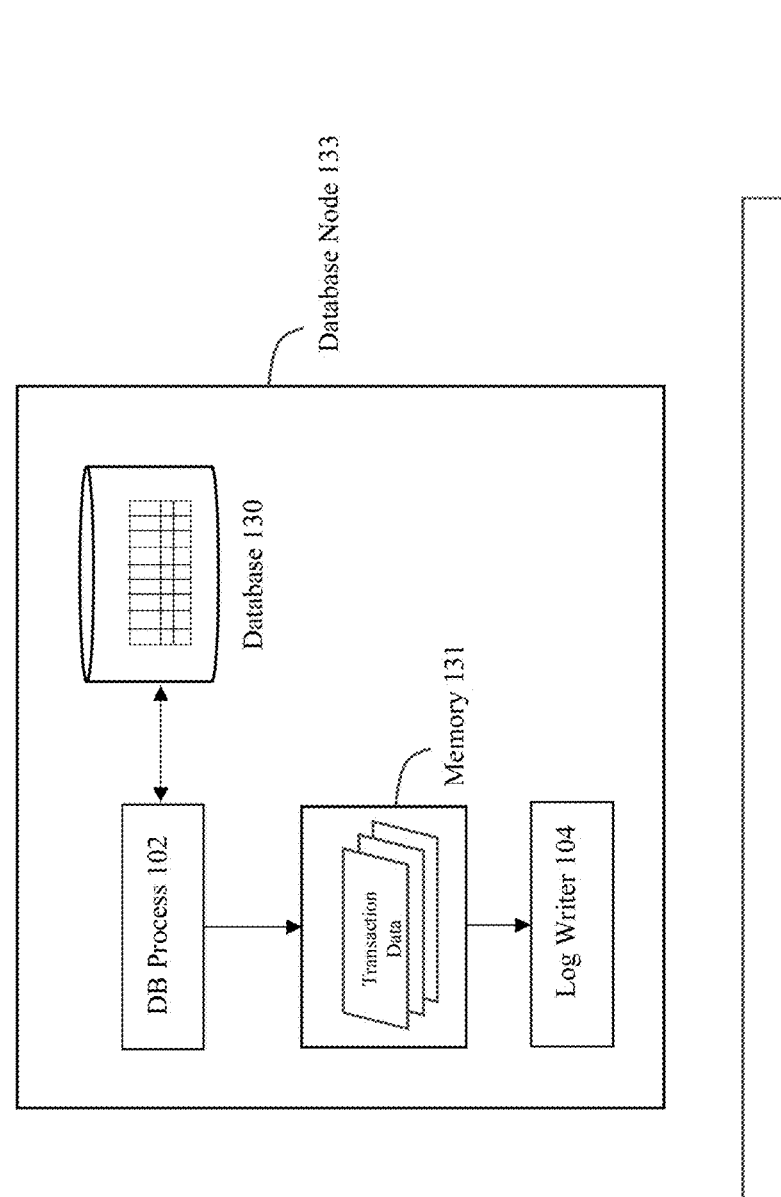
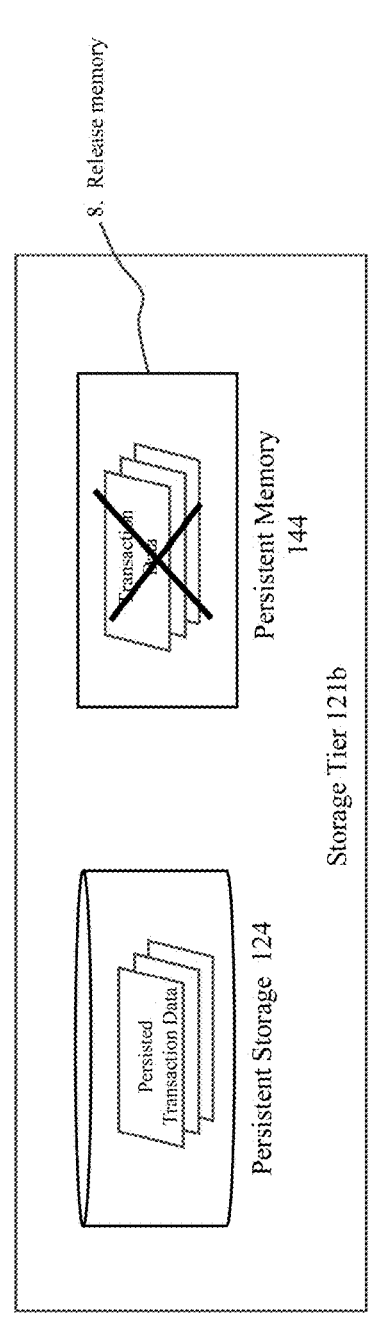
Fig. 41

USING PERSISTENT MEMORY AND REMOTE DIRECT MEMORY ACCESS TO REDUCE WRITE LATENCY FOR DATABASE LOGGING

CROSS-REFERENCE TO RELATED APPLICATIONS

The present application claims the benefit of priority to U.S. Provisional Application No. 62/897,969, filed on Sep. 9, 2019, which is hereby incorporated by reference in its entirety.

BACKGROUND

In the technical field of databases, various types of logs are normally maintained within database systems. For example, a "redo log" is maintained in many database systems to hold redo records that allow persistence and restoration of activities within a database system for transactional activities. An "undo log" may include records that are used to roll back changes for uncommitted transactions. Both are employed to ensure atomicity and durability of transactions in the database.

In many database systems, "write-ahead logging" is a type of technique that is used in the database. With write-ahead logging, modifications are written to a log before they are applied to a database. Prior to the commit of a transaction, the database must therefore make sure that the log entries are made persistent prior to the commit. This requirement to make the logs persistent allows the changes made by the committed transaction to be recoverable in the event of a failure or disaster. This is because, if not made persistent, then the unavailability of the log records after a disaster may result in the inability to re-create the correct state of the database and thus result in inconsistent and possibly erroneous states within the data maintained by the database.

As is evident, with write-ahead logging, a transaction in a database will be unable to commit unless and until its corresponding logs have been made persistent. The issue faced by database systems is that a "write latency" will result from the amount of time that is needed to write the log data to persistent storage prior to the moment when the transaction is permitted to transition to a committed state. For example, the write latency may include time costs relating to CPU costs, software/kernel costs, costs to perform I/O in a persistent storage system, and communications costs. Therefore, for many databases, a key performance issue that must be addressed pertains to the write latency that is needed to persist logging information. This write latency can often be a significant bottleneck for the database system. The industry has previously tried to solve the problem in several ways, such as for example, improving the communication between client and server, batching writes, writing logging data to flash, etc. However, even with all of these methods, write latency can still be problematic and indeed imposes a very significant barrier to optimal database performance.

What is needed, therefore, is a method and/or system that overcomes these problems, and which more efficiently implements log writing and transaction commits in a database system.

SUMMARY

According to some embodiments, a system, method, and computer program product is provided that uses persistent memory (which may also be referred to herein as non-volatile memory) to hold change records for databases. Some embodiments may use RDMA techniques to hold change records at a remote persistent memory location.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 3A-H illustrate the delay that may occur when writing transaction data to persistent storage.

FIGS. 4A-I provide an illustrative example of certain embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, a system, method, and computer program product is provided that uses persistent memory (PMEM) to hold change records for databases. The use of persistent memory to hold the change records serves to significantly reduce write latency during the processing of transactions and transaction commits.

Figure 1:
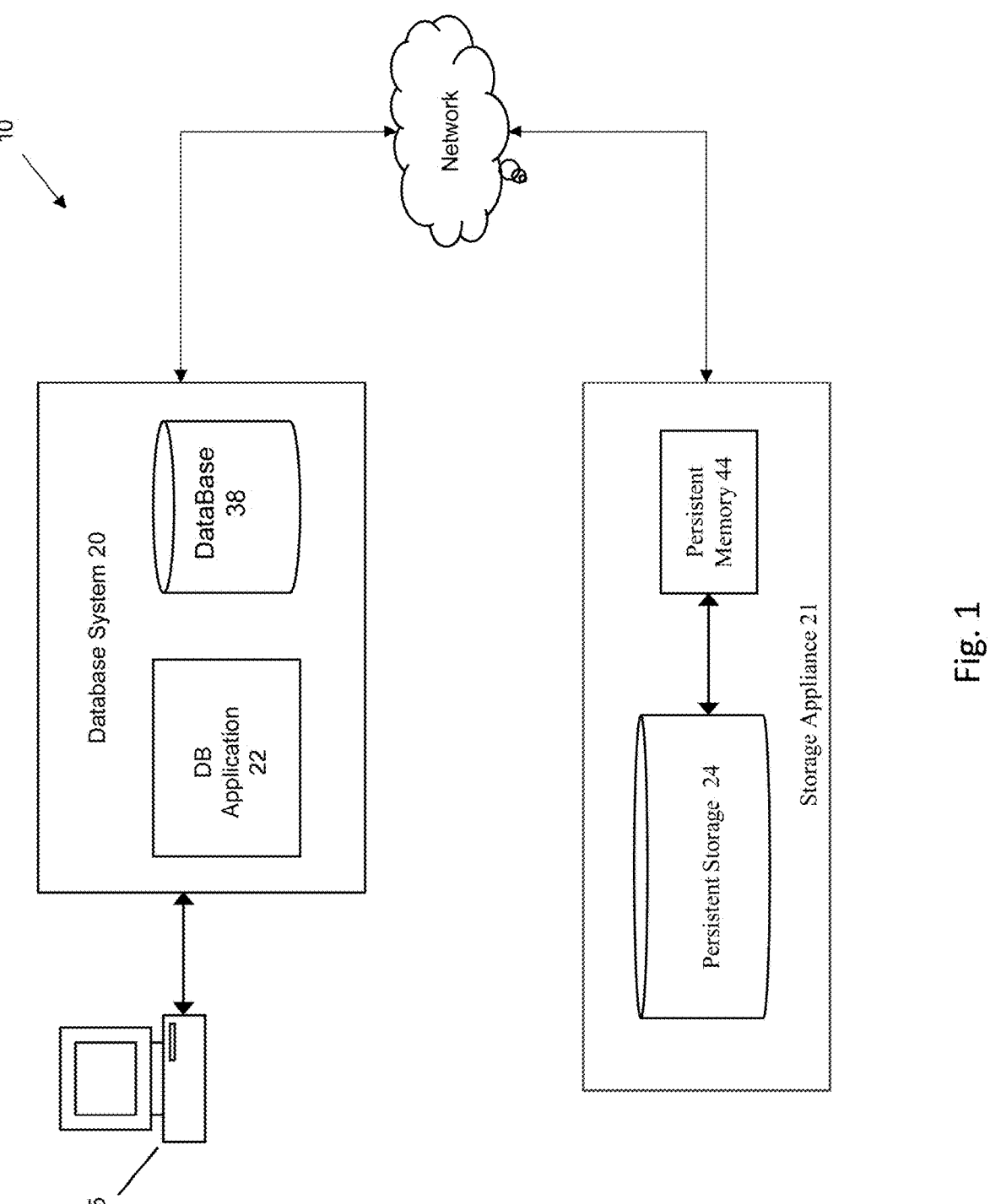
FIG. 1 illustrates a system for implementing some embodiments of the invention.

FIG. 1 illustrates a system 10 for implementing some embodiments of the invention. System 10 includes a database system 20 having a database application 22 and a database 38 (e.g., a database server) that are operated upon by one or more users/clients within the system. One or more users/clients operate a user station 5 to issue commands to be processed by the database system 20 upon one or more database tables. The user stations and/or the servers that host the database comprises any type of computing device that may be used to implement, operate, or interface with the database 38. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system 10, such as a mouse or keyboard to manipulate a pointing object in a graphical user interface to generate user inputs.

The database system 20 is communicatively coupled to a storage appliance 21 over a network. The storage appliance comprises any storage device that may be employed by the database system 20 to hold storage content. For purposes of the current embodiment, the storage appliance 21 comprises both persistent storage 24 and persistent memory 44. The persistent storage 24 may be implemented as any suitable type of storage that can hold storage content, such as e.g., a hard disk drive (HDD) or a solid disk drive (SSD). The persistent memory comprises any suitable type of persistent memory/non-volatile memory. For example, the persistent memory 44 may be implemented using a non-volatile dual in-line memory module (NVDIMM). As a non-limiting example of technology that may be used for the persistent memory, the persistent memory may be implemented using a ferroelectric random access memory (FRAM or FeRAM), where the RAM component includes a ferroelectric film that helps the device to retain data memory when power is shut off. Another non-limiting example of a non-volatile memory is a magnetoresistive RAM (MRAM) that uses magnetic storage elements to hold data in a non-volatile and persistent manner. The storage appliance 21 itself can be implemented using any suitable architecture or form factor according to embodiments of the invention. For example, the storage appliance 21 can be implemented a dedicated storage device such as a NAS (networked attached storage). The storage appliance 21 may also be implemented as a cloud-based storage service having both the persistent storage 24 and the persistent memory 44 implemented as cloud-based resources.

The database application 22 interacts with a database 38 by submitting commands that cause the database server to perform operations on data stored in a database. For the database server to process the commands, the commands typically conform to a database language supported by the database server. An example of a commonly used database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

Write-ahead logging is used to record all modifications performed on the database before they are applied. No changes are made to the database before the modifications are recorded. Furthermore, no transaction is acknowledged as committed until all the modifications generated by the transaction or depended on by the transaction are recorded. In this manner, write-ahead logging ensures atomicity and durability.

In one approach, the modifications are recorded as change records, which may be referred to herein as "redo" records. The change records are generated in-memory by a process executing a transaction, and are copied into one or more in-memory change log buffers. Multiple processes executing transactions may concurrently generate the change records into corresponding change log buffers. One or more writer processes gather the change records from the in-memory change log buffers and write them out to a persistent log file on disk. The change records are cleared from the in-memory change log buffers after they are written to persistent storage. When a writer process gathers change records from a particular region of an in-memory change log buffer, it needs to wait for and synchronize with activity from any process that is writing into the same region.

When a transaction commits, because write-ahead logging requires the change records to be persisted before applying the corresponding changes to the database, the writer process must write any remaining change records for the transaction from the corresponding in-memory change log buffer to the persistent log file. A commit change record is also generated to indicate the end of the transaction.

During the commit procedure, the process executing the transaction needs to wait for a writer process to gather and write the corresponding commit change record to the persistent log file. The process executing the transaction must also wait for the writer process to gather and write other change records for the transaction. If the transaction depends on other transactions, the writer process must also gather and write the change records of the other transactions. Furthermore, the writer process must wait for any other process that is modifying a corresponding region of the in-memory change log buffer. In addition, the commit processing must wait for the log data to be written to a persistent storage device, with a corresponding acknowledgement of the write into persistent storage, before the commit can occur. Indeed, the physical disk I/O performed by the writer process is a major time component of performing the commit operation.

With embodiments of the invention, these delays are minimized by transferring logging records to the storage appliance's persistent memory upon a transaction commit. In this way, commits can occur once the appropriate redo records for a given transaction have been placed into the storage appliance's non-volatile memory, without incurring delays inherent in performing I/O to a physical disk.

Figure 2:
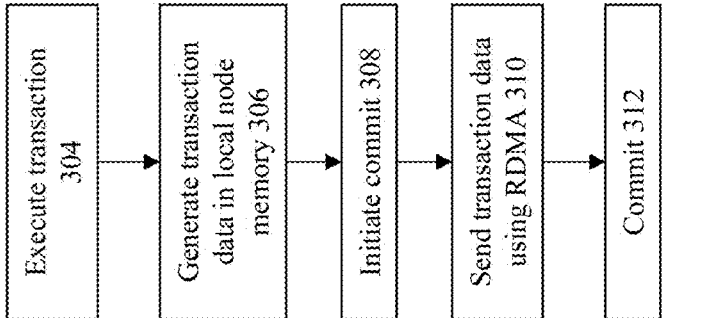
FIG. 2 shows a flowchart of an approach to implement some embodiments of the invention.

FIG. 2 shows a flowchart of an approach to implement some embodiments of the invention. At 304, a transaction is executed that performs one or more operations upon a database. The one or more operations may pertain to any type of operation to be performed within the system. For example, DML (data manipulation language) operations may be used to add/insert, delete, and/or modify content within existing database tables. In addition, DDL (data definition language) operations may be used to define or change the different structures within the database, e.g., by creating, modifying, or removing tables, columns, or other structures within a database system.

The execution of the transaction may, at step 306, generate transaction data that are stored in the local node memory. The in-memory log records are eventually transferred to a persistent redo log. The redo log may correspond to, for example, one or more online log files that are maintained by including ongoing redo records for operations performed with the database system. As the online log files s are filled up, those online log files would be archived into longer-term redo structures. The redo log files are filled with redo records. A redo record, also called a redo entry, is made up of a group of change vectors, each of which is a description of a change made to a single block in the database. For example, if a change is made to a salary value in an employee table, then the redo record is generated that contains change vectors that describe changes to the data segment block for the table, the undo segment data block, and the transaction table of the undo segments. The redo entries record data that can be used to reconstruct all changes made to the database, including the undo segments. Therefore, the redo log also protects rollback data. When one recovers the database using redo data, the database reads the change vectors in the redo records and applies the changes to the relevant blocks.

At 308, a commit may be initiated for the transaction to make the changes effected by the transaction permanent. A "commit" is the act of making permanent a set of tentative changes within a database system.

At this point, at step 310, the DB server will send the transaction data to the persistent memory in the storage appliance. In some embodiments, the log records are sent to the persistent memory in the storage appliance using the RDMA (remote direct memory access) protocol. RDMA is a protocol pertaining to direct memory access in a remote manner of one computing device from the operations of another computing device. This is an approach whereby the respective network interface devices (e.g., a network interface card or network adapter) that support RDMA at the database system and at the storage can directly perform direct memory access (DMA) based upon a read/write request from a remote system.

In some embodiments, the log records are sent to the persistent memory in the storage appliance using the RDMA (remote direct memory access) protocol in a "one-sided" manner. In particular, the database system is granted access to the persistent memory of the storage appliance, where the operation to write the log records to the storage appliance's persistent memory is based upon a direct memory access to the persistent memory by the database system—via remote put and get operations. The database system is provided access to a designated chunk of memory via the RDMA functionality of the network interface card in a manner that bypasses the kernel and remote CPU.

The RDMA protocol supports "zero-copy" operations to implement memory commands from a first system to a second system, where zero-copy refers to operations in which the CPU does not perform the task of copying data from one memory area to another memory area. Instead, the respective network interface devices will directly transfer the log data to the persistent memory at the storage appliance without needing to copy data from application memory and data buffers in the operating system. This eliminates and/or greatly reduces the overhead of having the CPU to implement the transfer of log records from the database to the storage appliance. In addition, the zero-copy operations serve to greatly reduce and/or eliminate any mode switches between user space and kernel space to perform the log transfers. By way of example, consider that reading and sending a file over a network without RDMA may require multiple datacopies and multiple context switches per ad/write cycle, where one of those data copies uses the CPU. In contrast, sending the same file using a zero-copy operation with RDMA reduces the context switches and eliminates/reduces the CPU data copies.

Since the logging information is sent in a one-sided fashion, this means that no response is required from the storage server. Instead, only an RDMA acknowledgement is needed to effect a commit at step 312. Therefore, this approach of using a one-sided RDMA message protocol to send database logging information to persistent memory is a significant technical difference from prior industry solution, and operates to significantly reduce write latency of database logging information for database system.

Figure 3C:
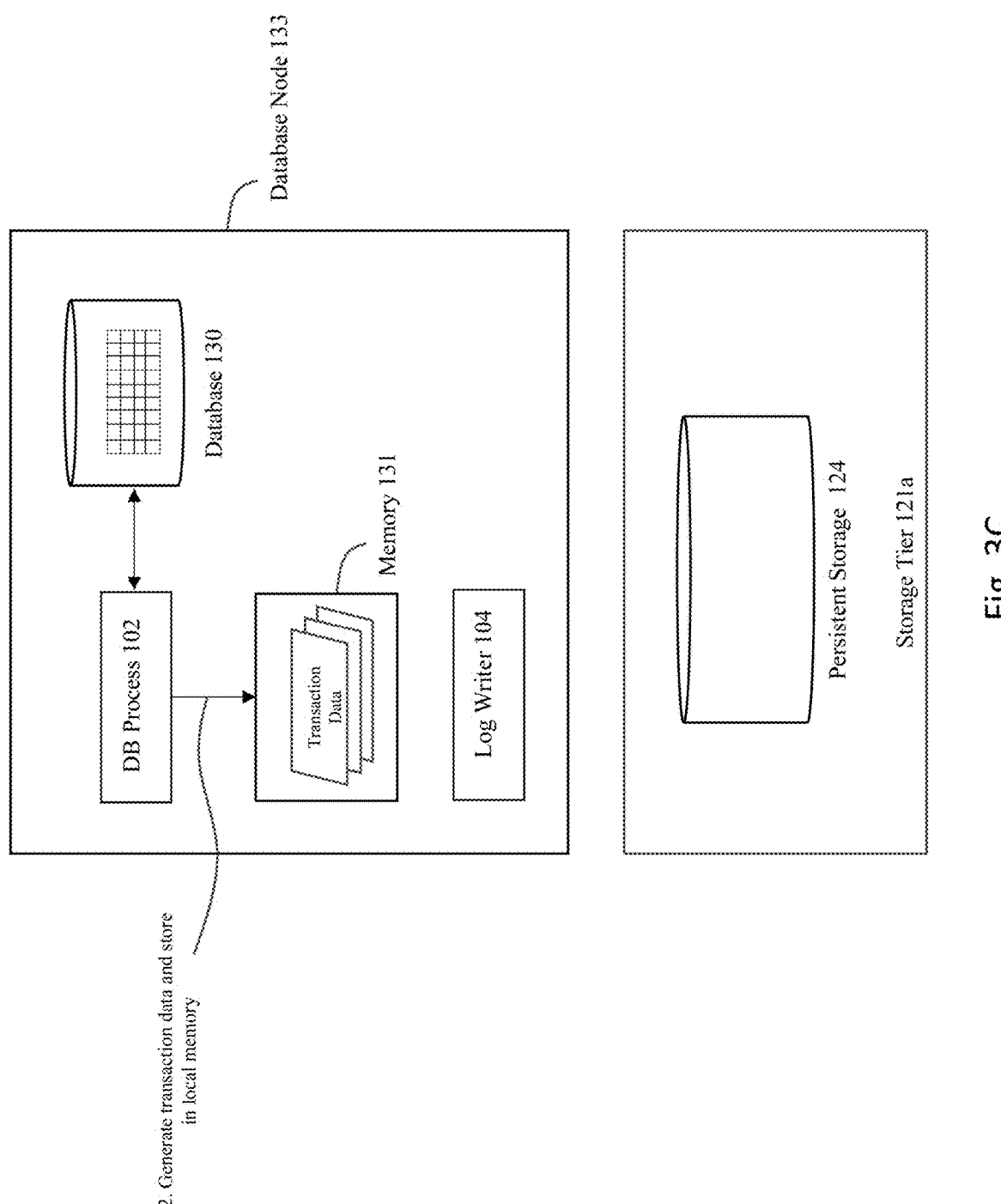

Before illustrating embodiments of the invention, it is helpful to first illustrate a non-optimal approach that does not use persistent memory. FIGS. 3A-H illustrate the delay that may occur when writing log records to persistent storage. FIG. 3A shows a database node 133 that includes one or more database processes 102 that operate upon a database 130. The database node 133 may include a log writer 104 to write log records from memory 131 into persistent storage 124 within a storage tier 121a.

Figure 3D:
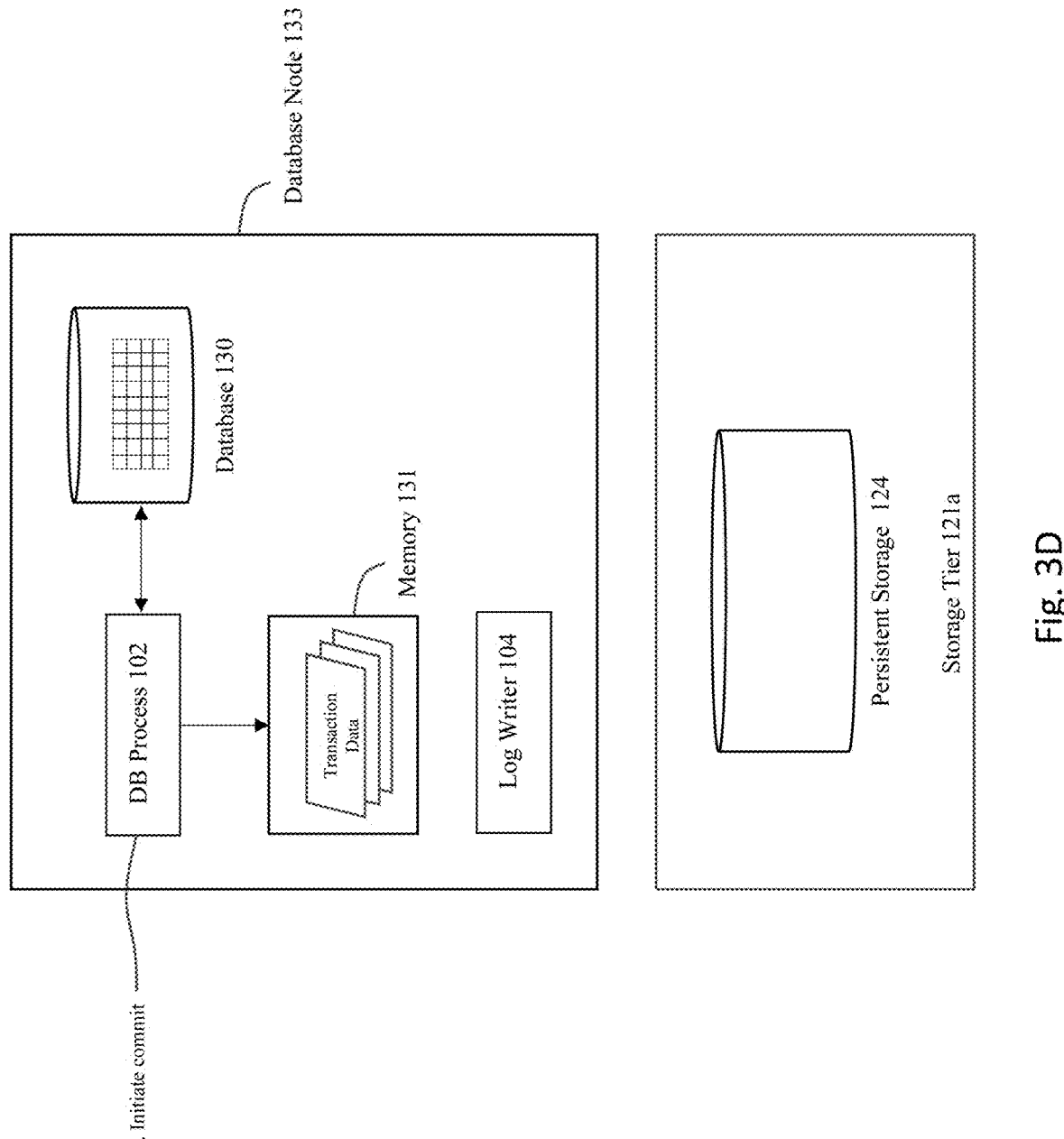
Figure 3E:
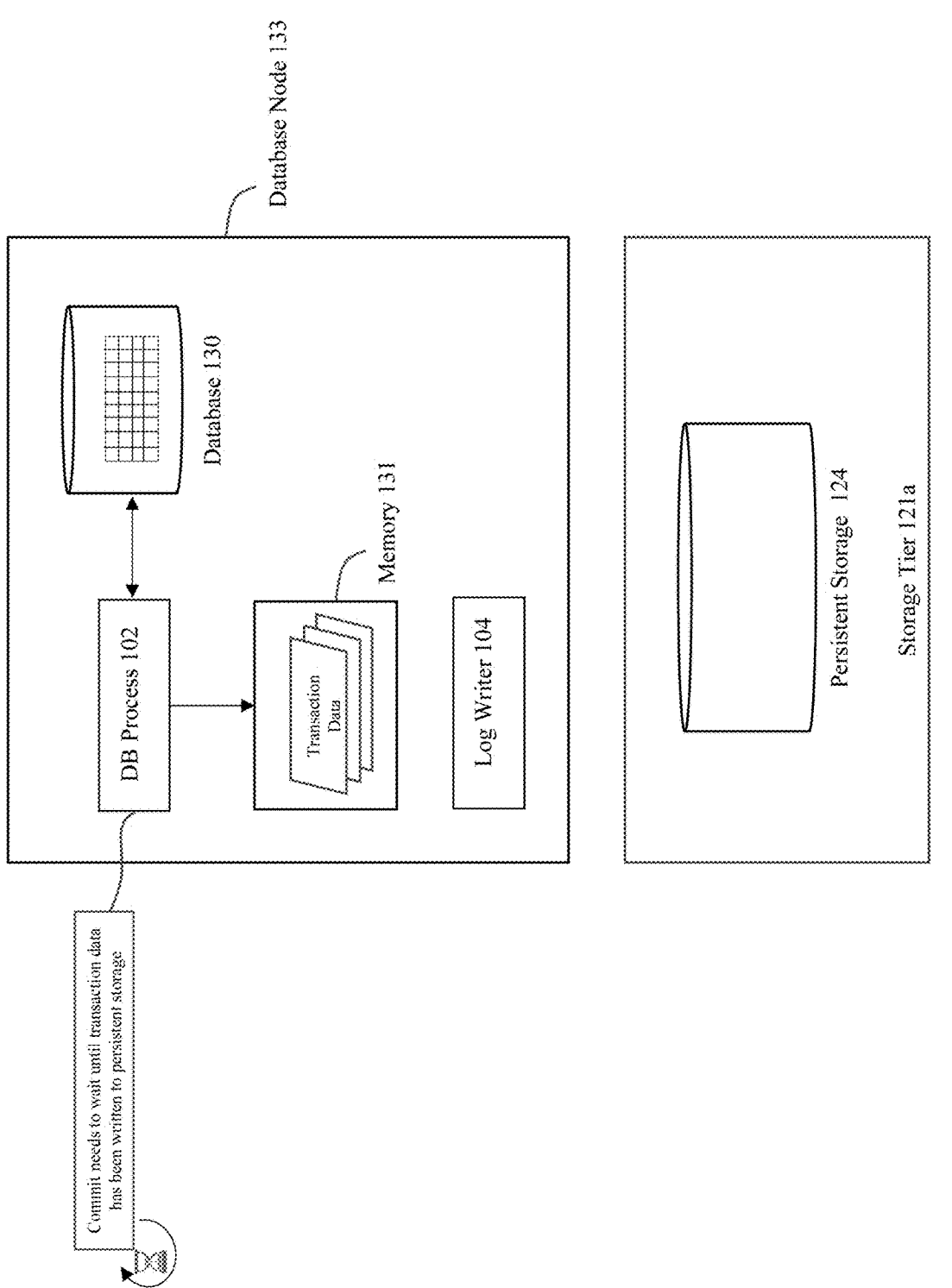
Figure 3F:
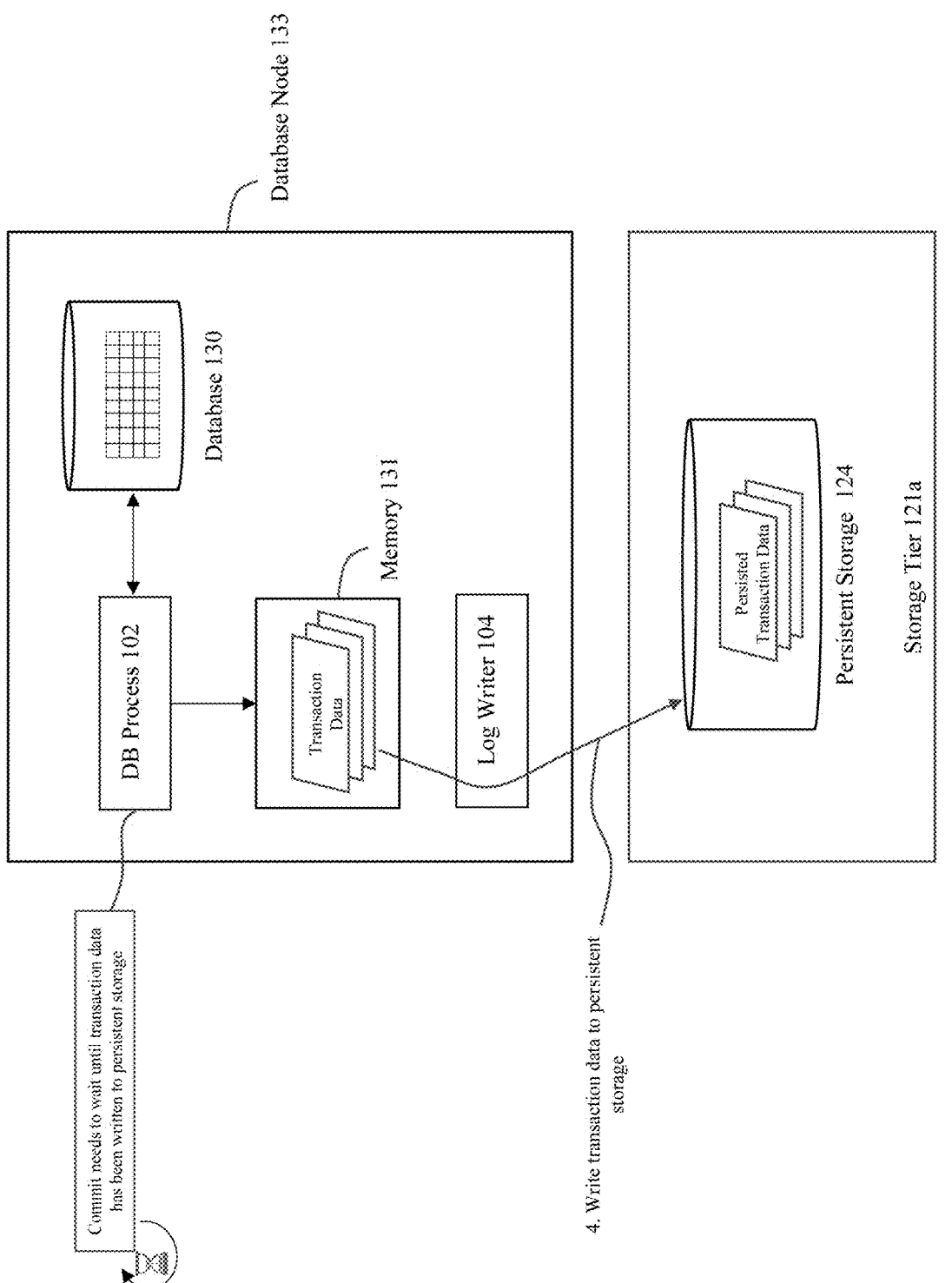
Figure 3G:
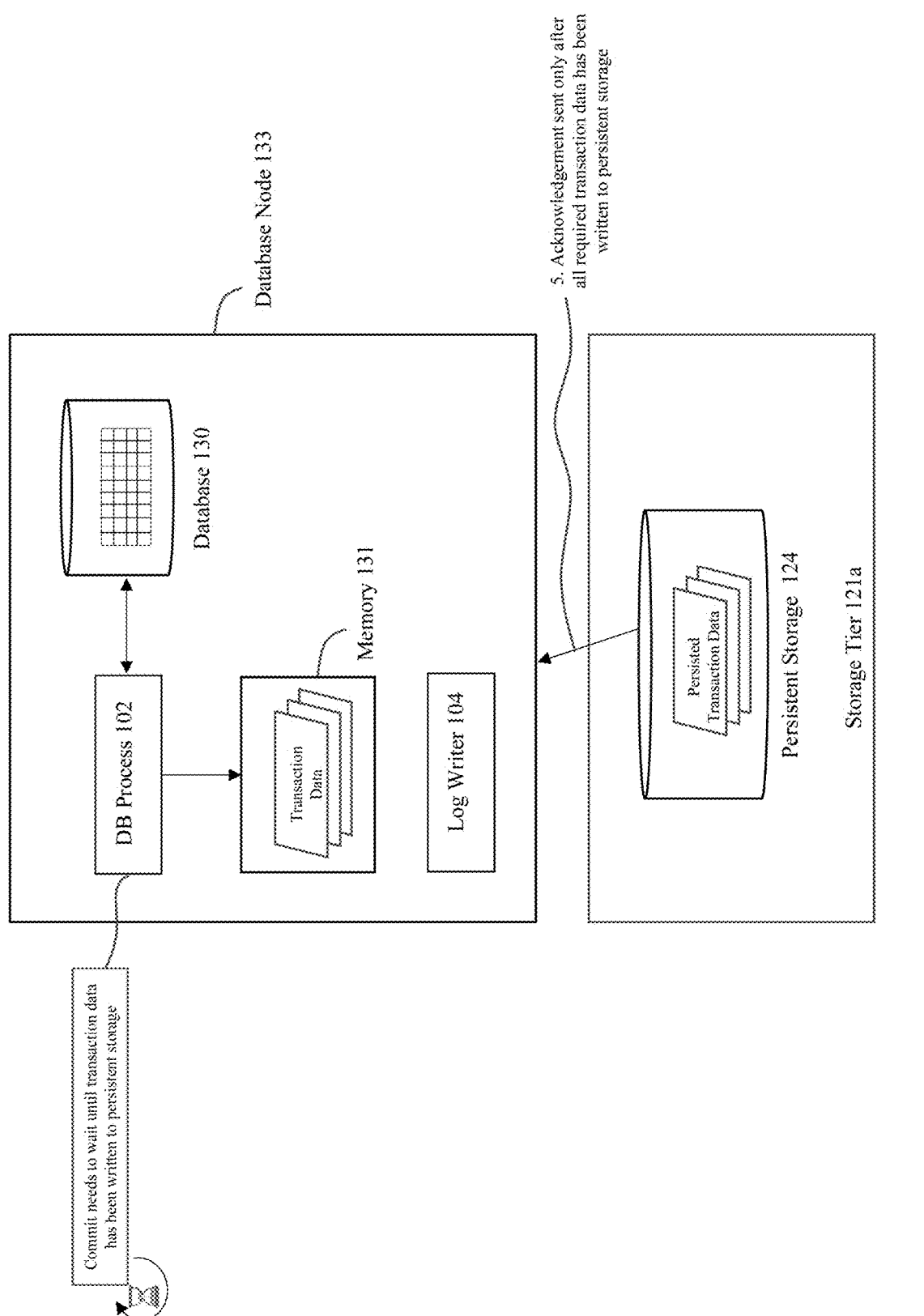
Figure 3H:
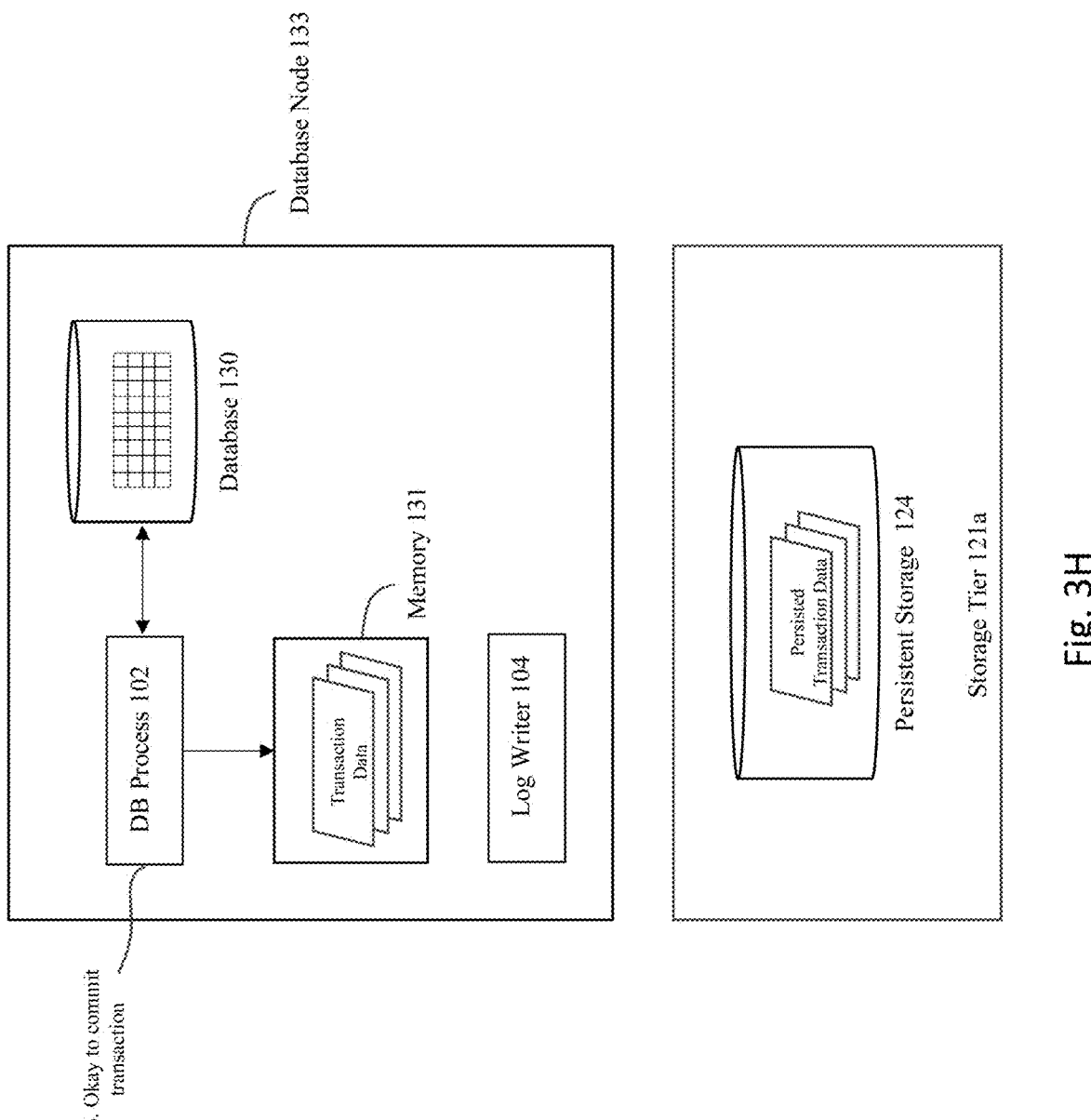

FIG. 3B illustrate that the DB process 102 may execute one or more operations for a transaction against a table within the database 130. As shown in FIG. 3C, these operations will result in the creation of one or more log records in memory 131. FIG. 3D illustrates that at some point, the DB process 102 may seek to commit the transaction that corresponds to the log records in memory 131. As shown in FIG. 3E, the commit must wait until the relevant log records have been written to persistent storage. Therefore, as shown in FIG. 3F, the log records are then stored into the persistent storage 124 to implement the commit of the DB transaction. After the log records have been persistently stored, an acknowledgement can then be sent back to the database node as illustrated in FIG. 3G. It is only at this point can the database transaction be committed, as shown in FIG. 3H.

As illustrated in these figures, this non-optimal approach to commit a transaction may undergo significant delays due to the time it takes to write log records to persistent storage (disk drives or SSDs) as well as the delay in receiving an acknowledgement back from the performing the persisting operations.

Embodiments of the invention provide an improved approach to implement logging which dramatically reduces the latency to perform transaction commits. In particular, embodiments of the invention provides persistent memory at the storage tier to temporarily hold the log records upon a commit, instead of merely relying upon HDDs or SSDs at the storage tier to hold the log files upon a commit.

FIGS. 4A-I provide an illustrative example of certain embodiments of the invention. The storage tier 121b in this system includes persistent memory 144 in addition to the HDDs/SSDs of the persistent storage 124. Any suitable type of persistent memory/non-volatile memory may be employed in embodiments of the invention. As a non-limiting example, the persistent memory 144 may be implemented using a ferroelectric random access memory (FRAM or FeRAM), where the RAM component includes a ferroelectric film that helps the device to retain data memory when power is shut off. Another non-limiting example of a non-volatile memory is a magnetoresistive RAM (MRAM) that uses magnetic storage elements to hold data in a non-volatile and persistent manner.

The system includes a database node 133 having a database 130 with one or more tables that are operated upon by one or more DB processes 102 within the system. One or more users at the clients operate a user station to issue SQL commands to be processed by the database upon the table.

Transaction log records are maintained to allow suitable recovery operations in the event of a system failure or aborted transaction. Some common problems that could cause a system failure or aborted transaction include hardware failure, network failure, power failure, database instance failure, data access conflicts, user errors, and statement failures in the database access programs (most often written in the structured query language or SQL). Different types of transaction log records can be maintained in a database system. A common transaction logging strategy is to maintain redo records that log all changes made to the database. With write ahead logging, each change to data is first recorded in the redo log, and only afterwards is that change actually made to the database block corresponding to the changed data. This protects against the situation when a system failure occurs and the version of the database data that is immediately restored from disk does not accurately reflect the most recent state of the database. This may occur because of changes to the data that has only occurred in cache, and have not been recorded to disk before the failure. If redo log have been properly maintained for these cache-only changes, then recovery can be performed by applying the redo records to roll the database forward until it is consistent with the state that existed just before the system failure.

In this system, the redo log records may be located in volatile memory 131. The volatile memory 131 holds the main change log buffers used for transactions upon the database 130.

Figure 4C:
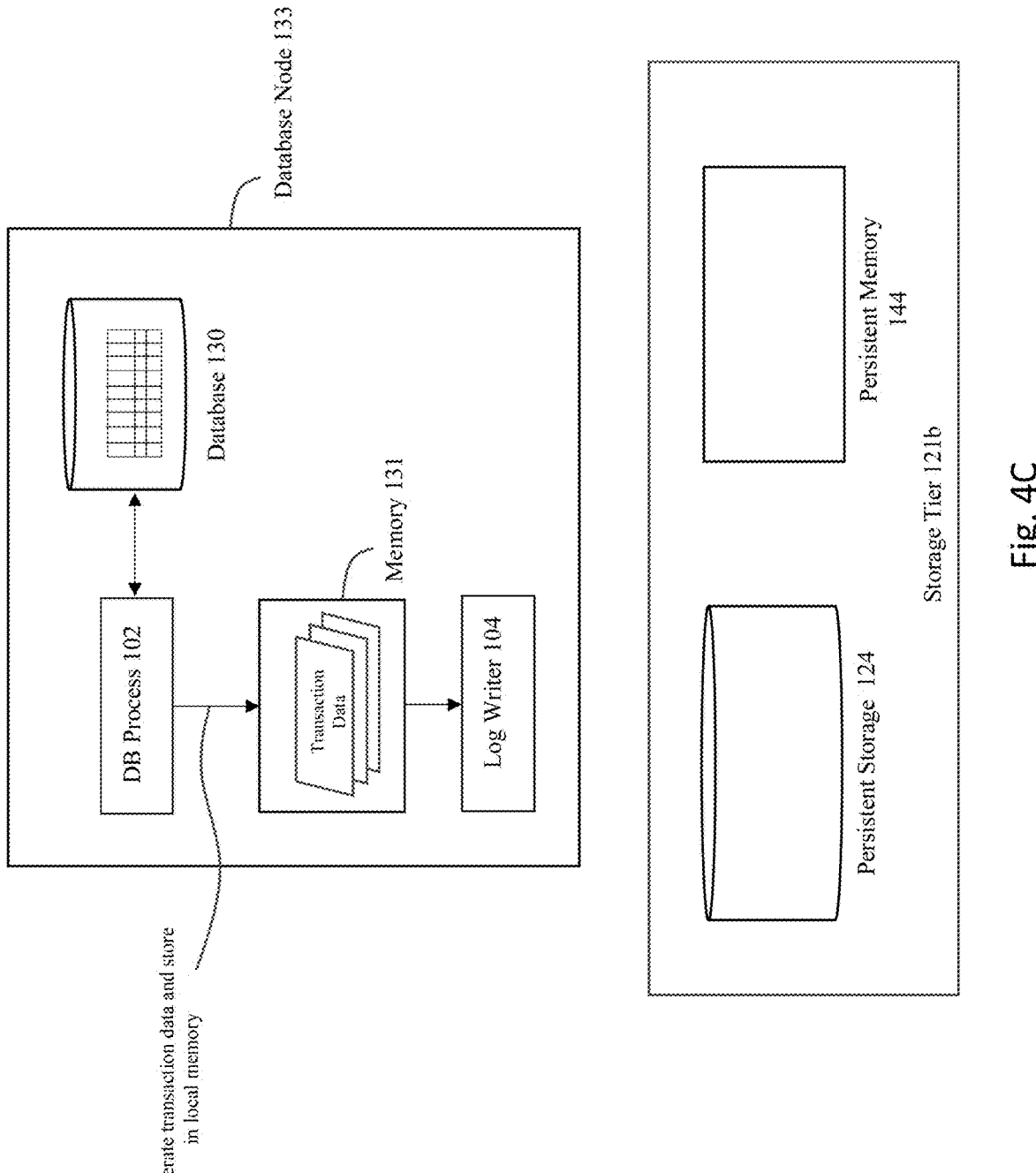

In operation, one or more transactions may operate upon one or more tables within database 130 (as shown in FIG. 4B). Certain of the transactions may generate redo records that are placed within log buffer within the shared memory 131, as shown in FIG. 4C. These transactions cannot be committed until their associated redo records have been durably stored within the storage tier 121*b*. The reason for this is because the redo records for these transactions are initially placed into buffer locations in volatile memory 131. Since volatile memory 131 is "volatile", this means that a failure of a computing node may cause loss of the data within volatile memory hosted by that computing node, including loss of the redo log records within that memory. Therefore, in the case of write-ahead logging, failure to persist those redo records prior to commit may cause permanent loss of data and inconsistent data states since the data changes represented by the lost redo records do not persistently exist and therefore may be unrecoverable if the redo records themselves are lost (e.g., by failure or shutdown of either the volatile memory or the host computer for that memory).

Figure 4D:
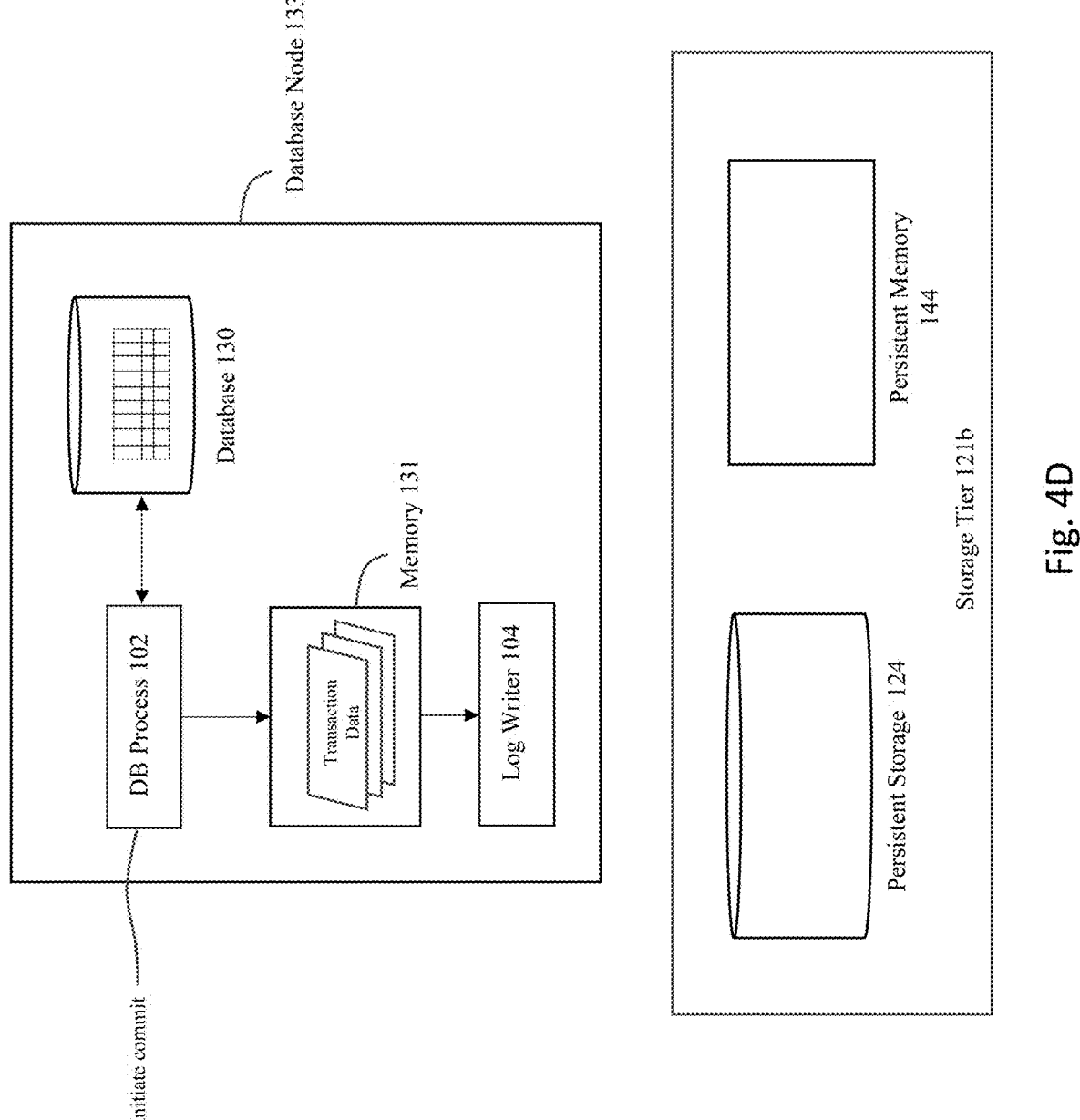
Figure 4E:
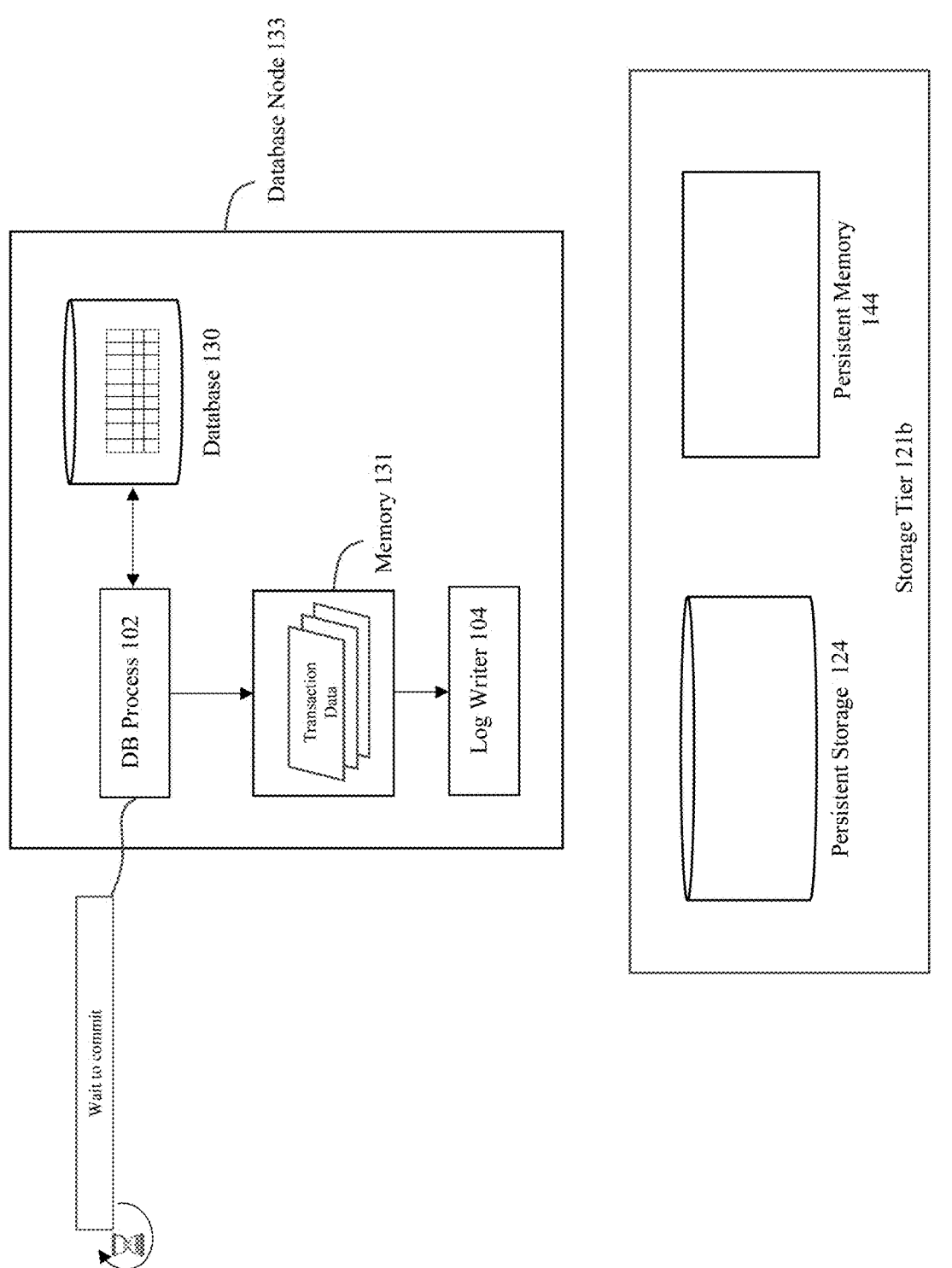
Figure 4F:
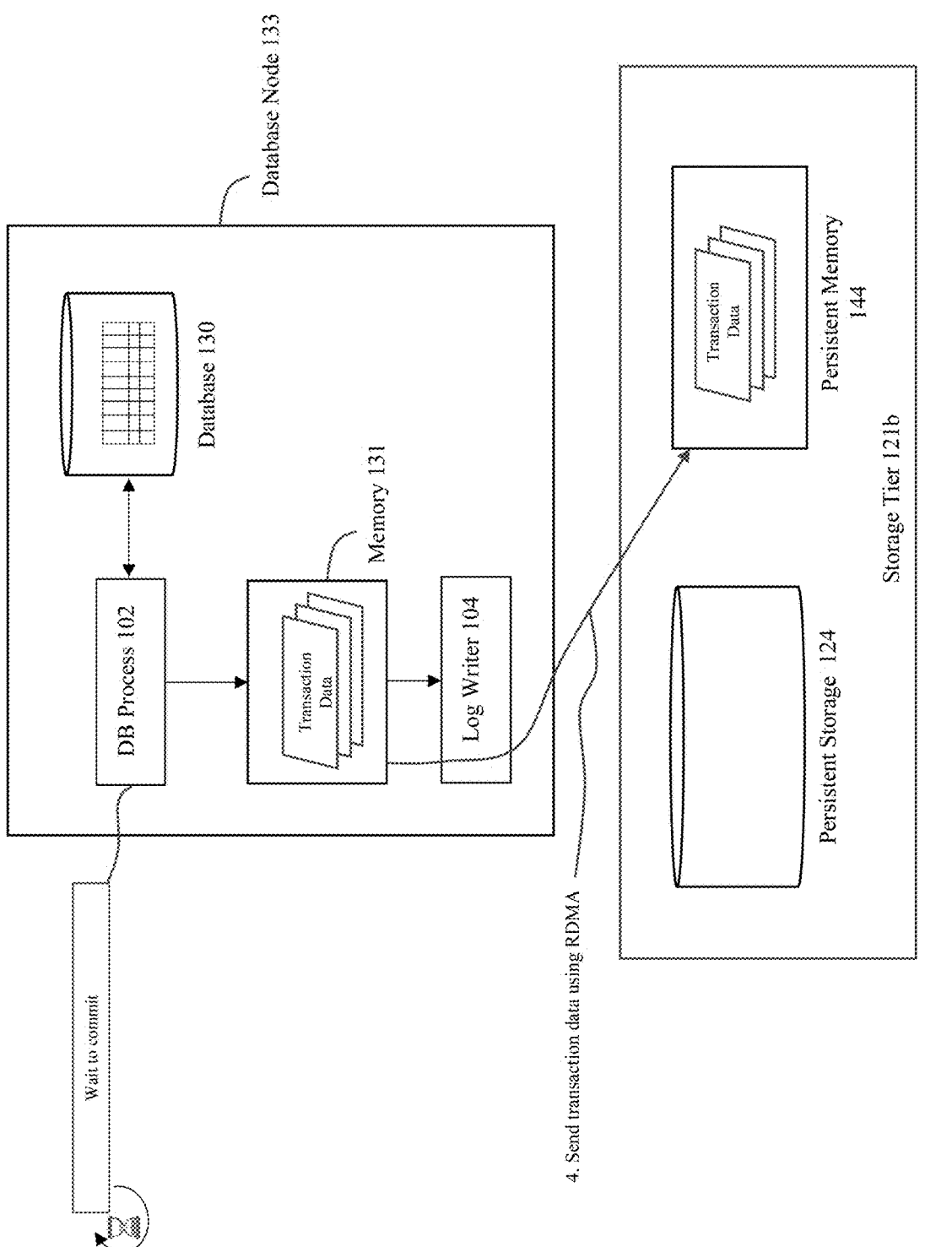
Figure 4G:
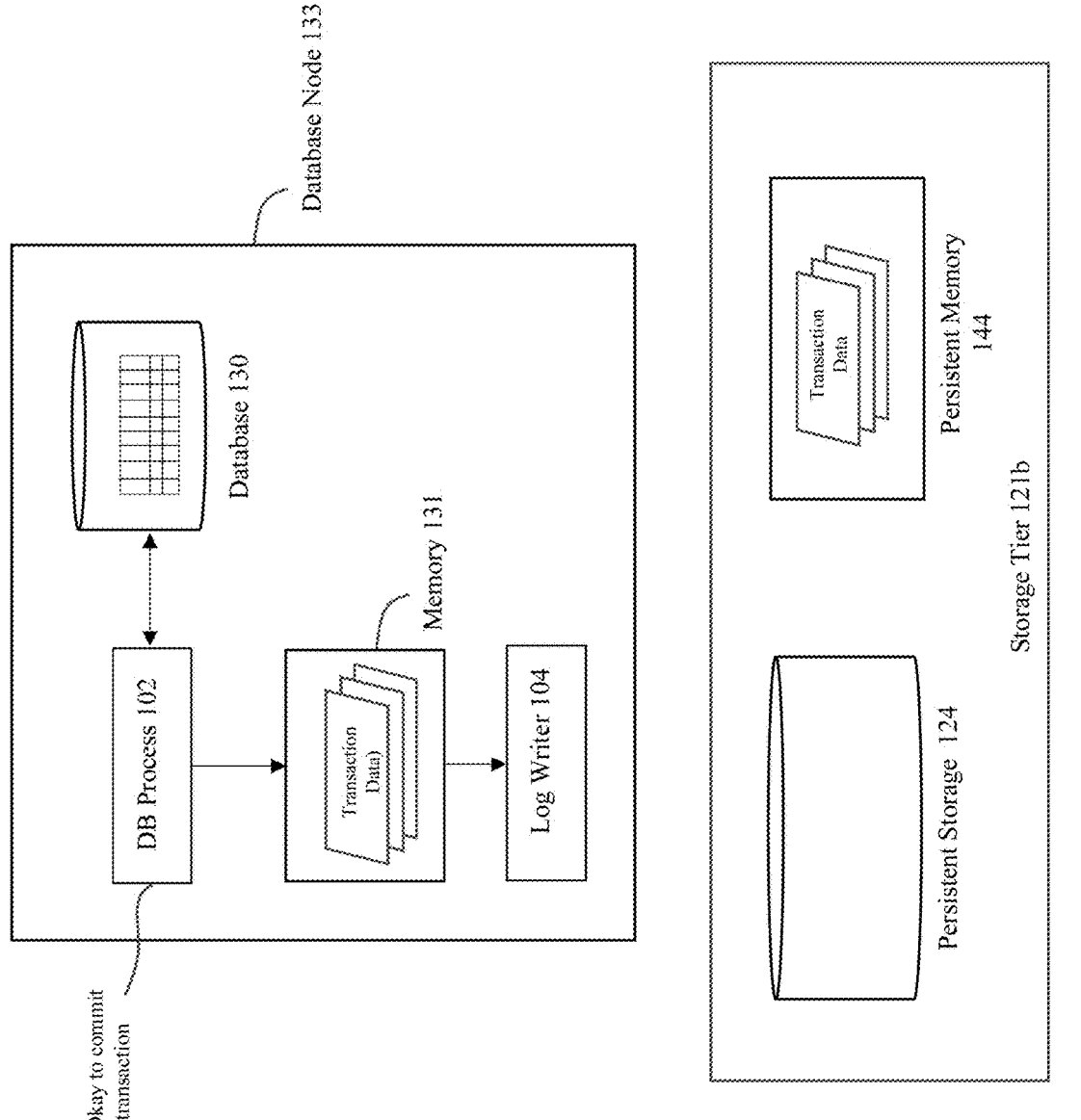

To address this issue, a log writer 104 is instructed to write redo records from the log buffer from the volatile memory 131 in the storage tier 121*b*. With embodiments of the invention, the commit process will initially send the log records to be stored in the persistent memory 144. As shown in FIG. 4D, a commit may be initiated, where as shown in FIG. 4E that commit must wait until the log records have been persisted. However, unlike the approach of FIGS. 3A-H where the log records are placed in the persistent storage devices 124 (e.g., HDDs or SSDs), FIG. 4F illustrates that the log records of the current embodiment are instead directed to persistent memory 144. The DB node/client sends logging information to the persistent memory 144 in the storage tier via RDMA, which is much faster than any existing communication mechanisms, including high-speed interconnects. The logging information is sent to a storage server's persistent memory region, where it can survive a software or hardware crash. The logging information is sent in a one-sided fashion, meaning that no response is required from the storage server, e.g., it is a one-way messaging protocol. It is notable that the client does not need to explicitly wait for an RDMA acknowledgement, since this is a "one-sided" RDMA request where the client simply sends the data using RDMA and then does not wait for an acknowledgement—a successful RDMA-send is essentially used an implicit indication that the RDMA-send completed. However, any acknowledgement that may be received and/or used is merely a RDMA acknowledgment, which is extremely fast and from the RDMA-enabled NIC. Therefore, the current approach is much faster than the previous approach of using the type of acknowledgement that is conventionally required for DB commits, which goes through the full client/server round-trip processing to handle and facilitate storage of redo logs into a redo log structure in persistent storage 124. As such, the commit that occurs as shown in FIG. 4G can occur very quickly with minimal delays.

Figure 4H:
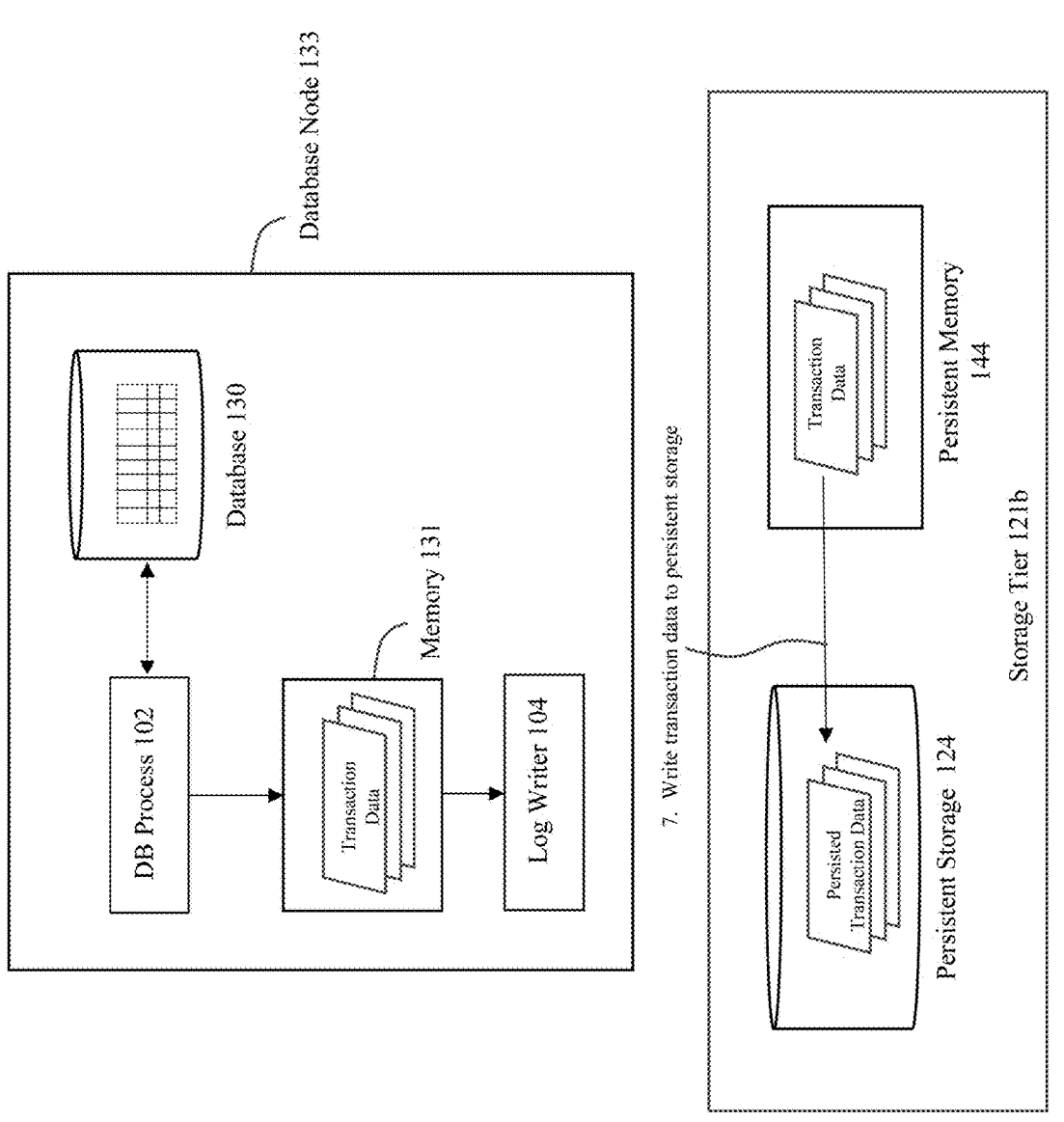

As shown in FIG. 4H, at a later point in time, the log records in the persistent memory 144 will be moved into the conventional log structures within the persistent storage 124. This occurs after the commit has already happened so that the commit itself is not delayed. Afterwards, as shown in FIG. 4I, the log records can be removed from the persistent memory 144, freeing up the persistent memory to hold log records for other transaction that seek a fast commit process. The log records can be moved to the persistent storage and cleaned up from the persistent memory on any suitable basis, criteria, and/or schedule. For example, in one embodiment, a periodic basis is established for moving the log records from the persistent memory to the persistent storage, with a subsequent periodic "garbage collection" process to remove the log records from the persistent memory. Alternatively, various criteria may be established to perform these activities, e.g., where one or more thresholds are established for usage and/or amount of free space within the persistent memory to take these actions, where if the usage rises to a given threshold or amount of free space in the persistent memory falls to a given threshold, then the log records from the persistent memory will be moved to the persistent storage, and the log records subsequently cleaned out from the persistent memory.

In summary, using a one-sided RDMA message protocol to send database logging information to persistent memory is a significant technical difference from prior industry solutions. This approach significantly reduces write latency of database logging information for database systems.

Figure 5:
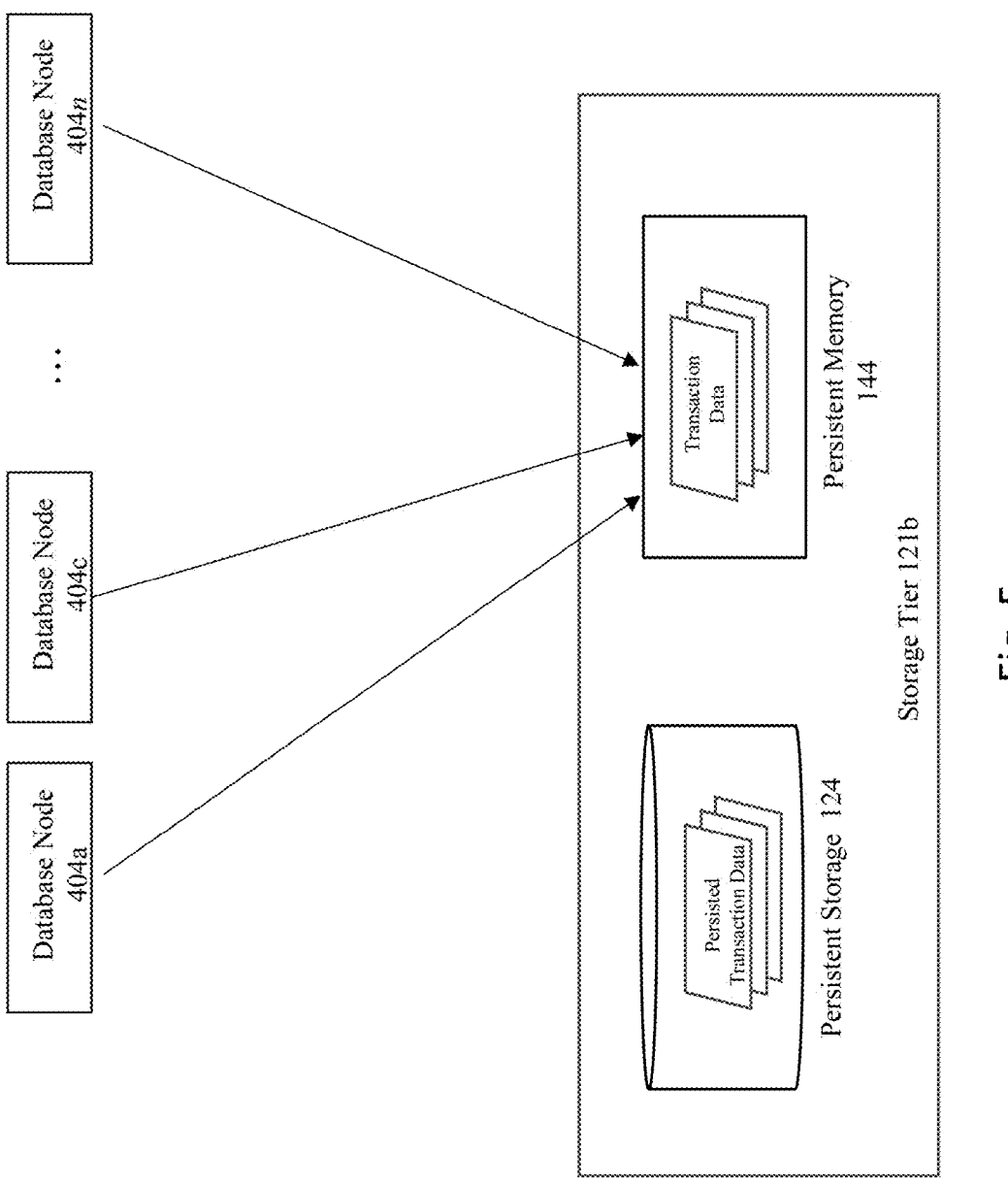
FIG. 5 illustrates multiple database nodes using a common storage appliance.

As illustrated in FIG. 5, one advantage of the current approach of placing the persistent memory at the storage tier is that this means multiple database nodes may share the same set of persistent memory to effectuate faster commits. As such, multiple database nodes 404a-n may all use the same persistent memory 144 within a common storage appliance to hold log data to reduce write latencies for transaction commits. This is in contrast to alternative approaches where the persistent memory is placed within a database system itself, rather than at a shared storage tier as shown in FIG. 5. Given the relatively higher cost of persistent memory, this approach allows the overall database system to leverage the common storage tier 121b to more efficiently increase utilization of the persistent memory while reducing overall costs. This is especially advantageous in situations where the individual database systems may experience periods of lower usage, and thus make it inefficient for each separate database system to have its own persistent memory. Instead, by sharing a common set of persistent memory among the different database nodes, the present embodiment allows the persistent memory to be efficiently used by whatever database node has the current need for the memory.

This document will now provide additional details regarding implementations of the invention according to certain embodiments.

In some embodiments, the persistent memory includes one or more separate portions to contain the transaction logs. The PMEMLOG (persistent memory log) is composed of a set of staging buffers that reside in the persistent memory (PMEM). These buffers are posted to a set of shared receive queues (SRQs), where there are multiple SRQs per NVDIMM device, with SRQs being partitioned by cluster as well as buffer/band size.

Clients will use RDMA operations to send redo log data and control data (such as destination grid disk) to the appropriate SRQ, based on the destination grid disk and the size of the redo log data. Clients will not wait for any acknowledgement from the database process. Instead, an RDMA operation is implemented such that it can be verified that data is valid, even in the case of a crash. One or more threads will poll for notification of new PMEMLOG data sent via RDMA. These threads will ensure that data is written to disk, and buffers are posted back to SRQs. In the case of a crash, upon a subsequent restart, the staging buffers can be scanned for data that was not yet written, and flush any relevant data to disk. This can be done during startup, before the system allows new client I/O requests.

In some embodiments, the client performs a sequence of RDMA operations for each redo log write request. The operation sequence includes a RDMA-SEND of control information (target grid disk, location, etc.) and redo data to the primary NVDIMM. This is followed by a RDMA-SEND of the same control information to primary NVDIMM, but with a "commit" indication/flag. The subsequent operation is a RDMA-READ of zero bytes; this is done in order to guarantee that the prior data sent via RDMA-SEND has indeed landed in the storage appliance's persistent memory. At this point, the client can consider the redo log write request to be completed.

During run-time, RDMA message processing on the storage tier will write log data to disk as soon as the message corresponding to the first RDMA-SEND is received. The commit message corresponding to the second RDMA-SEND is simply discarded during run-time processing. However, after a storage server crash and subsequent restart, recovery will only write data to disk if it finds both messages. It is noted that although there is some wasting of buffers that are used only to hold control information, these buffers will be used for a very short amount of time; as soon as the system finds the matching redo data, the commit buffers can be reposted/reused.

In order to preserve the correct ordering of log data on persistent storage, completion queues are utilized to order the incoming log records. In some embodiments, there is one completion queue per NVDIMM, but it is also possible to implement correct ordering using fewer completion queues as long as log records for the same destination disk are sent to the same completion queue. In addition, there is one thread polling each completion queue. If there are multiple writes to the same disk region, newer writes should not be scheduled until the older writes finish first.

To minimize failure, a given disk will be assigned to a specific NVDIMM, and all writes to that disk will only use PMEMLOG buffers on that NVDIMM. In addition, the system will try to evenly distribute or assign disks to NVDIMMs. Thus, in the case of an NVDIMM failure, a minimal number of disks will be affected.

Minimization of failure is handled by having redundant copies of log files. Each set of log records is written to all copies. After a storage server failure, the database server has the logic to examine all copies and then deduce which copy has the latest and correct version of log records.

The PMEMLOG will be composed of different sets of buffers of various sizes, e.g., between 512 bytes and 1 megabyte. The number of buffers (or percentage of the total PMEM) for each size can probably be initially statically configured. However, in some embodiments, due to the load or even the application itself, buffers of different sizes may be utilized differently: buffers of some sizes may be mostly unused and readily available, while buffers of other sizes may be heavily used and often unavailable. Some embodiments may move buffers (e.g., involving partitioning or coalescing) from one sized pool to another.

Therefore, what has been described is an improved approach to use persistent memory to implement fast commits for database processing. With embodiments of the invention, these write latencies for log data are minimized by transferring logging records to persistent memory upon a transaction commit. In this way, commits can occur once the appropriate redo records for a given transaction have been placed into non-volatile memory, without the delays inherent in performing I/O to a physical disk.

System Architecture Overview

Figure 6:
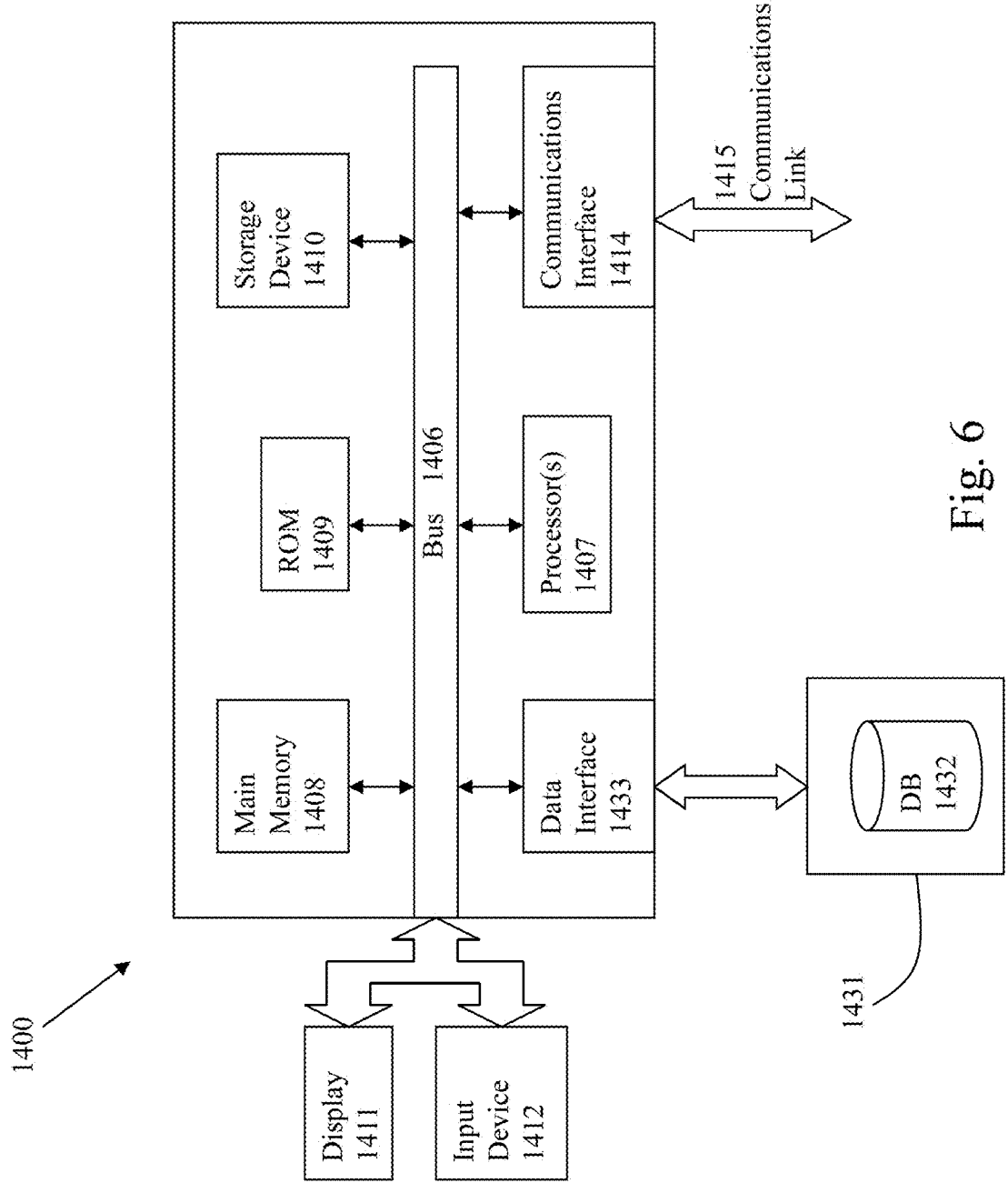
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 7:
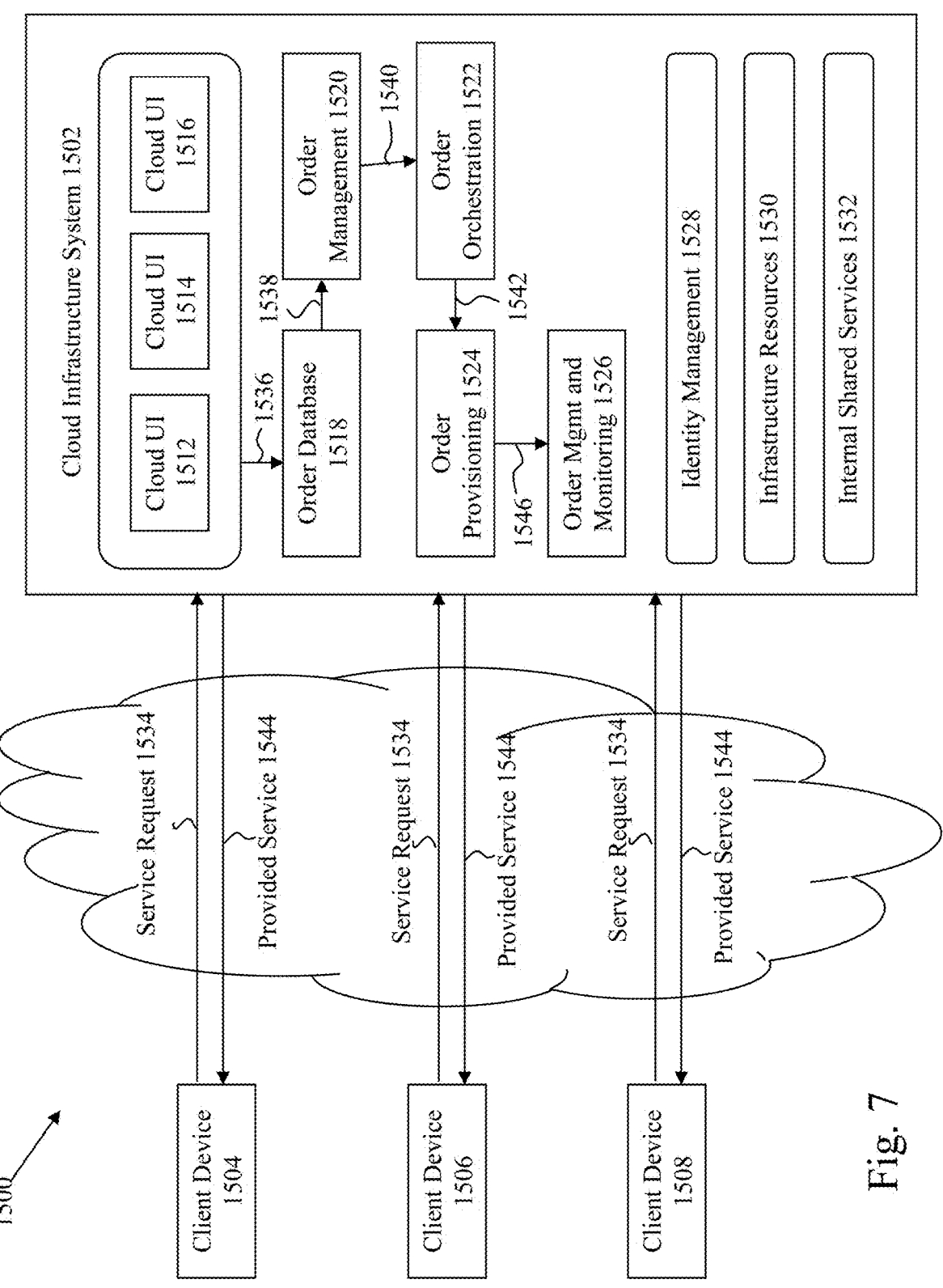
FIG. 7 is a block diagram of one or more components of a system environment in which services may be offered as cloud services, in accordance with an embodiment of the present invention.

FIG. 7 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described above for FIG. 6. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
executing operations for a first transaction in a first database at a database node of multiple database nodes, wherein
the database node of the multiple database nodes comprises the first database,
the multiple database nodes share use of a persistent memory within a remote storage appliance to hold log records for the first transaction, and
the remote storage appliance is connected to and shared by the multiple database nodes over a network so that each database node of the multiple database nodes shares the persistent memory for respective commits of respective transactions executing on respective database nodes;
generating log data for the operations for the first transaction at the first database;
initiating a commit of the first transaction;
sending the log data together with a request to write the log data to the persistent memory at the remote storage appliance; and
committing the first transaction after successfully sending the request, by the database node, together with the log data for the first transaction using a one-sided protocol to the persistent memory, without the database node waiting for acknowledgment from the remote storage appliance.

2. The method of claim 1, further comprising:
executing a separate, second transaction that implements a separate uncommitted change to a second database at a second database node of the multiple database nodes, wherein
the second transaction implements an uncommitted change to the first database instance at the database node of the multiple database nodes, and
the first and second transactions are respectively executed on the first and the second database nodes at least by sharing the persistent memory in the remote storage appliance for respective commits of respective first and second transactions.

3. The method of claim 1, wherein
the commit is initiated after the first transaction implements an uncommitted change to the first database on the database node, the remote storage appliance comprises the persistent memory and the persistent storage that includes one or more storage devices, and a remote direct memory access (RDMA) operation is used to store at least the log data to the persistent memory.

4. The method of claim 3, wherein the log data is stored at the persistent memory with the one-sided RDMA protocol that comprises a one-sided RDMA protocol where no response is required from the remote storage appliance.

5. The method of claim 1, wherein a zero-copy operation is implemented to store the log data at the persistent memory while bypassing a CPU at the remote storage appliance.

6. The method of claim 1, further comprising:

after moving the log data for the first transaction to the persistent storage within the remote storage appliance, removing the log data for the first transaction from the persistent memory, wherein the log data is stored at the persistent memory and committed upon a successful remote direct memory access (RDMA) send operation by the database node.

7. The method of claim 1, wherein the first transaction is committed prior to the log data being stored in a persistent storage device in the remote storage appliance, the request is a one-sided request sent via the one-sided protocol, the first database sends the request without waiting for the acknowledgement from the remote storage appliance, and the database node of the multiple database nodes includes one or more database processes to operate over the first database at the database node.

8. The method of claim 1, wherein the log data in the persistent memory is transferred to a persistent storage device at the remote storage appliance, and the log data is removed from the persistent memory.

9. A system, comprising:

a processor; and a memory for holding programmable code; wherein the programmable code includes instructions which, when executed by the processor, cause the processor to execute a set of acts, the set of acts comprising:

executing operations for a first transaction in a first database at a database node of multiple database nodes, wherein the database node of the multiple database nodes comprises the first database, the multiple database nodes share use of a persistent memory within a remote storage appliance to hold log records for the first transaction, and the remote storage appliance is connected to and shared by the multiple database nodes over a network so that each database node of the multiple database nodes shares the persistent memory for respective commits of respective transactions executing on the eachrespective database nodes;

generating log data for the operations for the first transaction at the first database;

initiating a commit of the first transaction;

sending the log data together with a request to write the log data to the persistent memory at the remote storage appliance; and committing the first transaction after successfully sending, by the database node, the request together with the log data for the first transaction using a one-sided protocol to the persistent memory, without the database node waiting for acknowledgment from the remote storage appliance.

10. The system of claim 9, wherein the set of acts further comprises:

executing a separate, second transaction that implements a separate uncommitted change to a second database at a second database node of the multiple database nodes, wherein the second transaction implements an uncommitted change to a first database instance at the database node of the multiple database nodes, and the first and second transactions are respectively executed on the first and the second database nodes at least by sharing the persistent memory in the remote storage appliance for respective commits of respective first and second transactions.

11. The system of claim 9, wherein the commit is initiated after the first transaction implements an uncommitted change to the first database on the database node, the remote storage appliance comprises the persistent memory and the persistent storage that includes one or more storage devices, and a remote direct memory access (RDMA) operation is used to store at least the log data to the persistent memory.

12. The system of claim 11, wherein the log records are stored at the persistent memory with the one-sided RDMA protocol that comprises a one-sided RDMA protocol where no response is required from the remote storage appliance.

13. The system of claim 9, wherein a zero-copy operation is implemented to store the log data at the persistent memory while bypassing a CPU at the remote storage appliance.

14. The system of claim 9, the set of acts further comprising:

after moving the log data for the first transaction to the persistent storage within the remote storage appliance, removing the log data for the first transaction from the persistent memory, wherein the log data is stored at the persistent memory and committed upon a successful remote direct memory access (RDMA) send operation by the database node.

15. The system of claim 9, wherein the first transaction is committed prior to the log data being stored in a persistent storage device, the request is a one-sided request sent via the one-sided protocol, the first database sends the request without waiting for the acknowledgement from the remote storage appliance, and the database node of the multiple database nodes includes one or more database processes to operate over the first database at the database node.

16. The system of claim 9, wherein the log data in the persistent memory is transferred to a persistent storage device at the remote storage appliance, and the log data is removed from the persistent memory.

17. A computer program product embodied on a non-transitory computer readable medium, the non-transitory computer readable medium having stored thereon a sequence of instructions which, when executed by a processor, causes the processor to perform a set of acts, the set of acts comprising:

executing operations for a first transaction in a first database at a database node of multiple database nodes, wherein the database node of the multiple database nodes comprises the first database, the multiple database nodes share use of a persistent memory within a remote storage appliance to hold log records for the first transaction, and the remote storage appliance is connected to and shared by the multiple database nodes over a network so that each database node of the multiple database nodes shares the persistent memory for respective commits of respective transactions executing on respective database nodes;

generating log data for the operations for the first transaction at the first database;

initiating a commit of the first transaction;

sending the log data together with a request to write the log data to the persistent memory at the remote storage appliance; and committing the first transaction after successfully sending the request, by the database node, together with the log data for the first transaction using a one-sided protocol to the persistent memory, without the database node waiting for acknowledgment from the remote storage appliance.

18. The computer program product of claim 17, wherein the set of acts further comprises:

executing a separate, second transaction that implements a separate uncommitted change to a second database at a second database node of the multiple database nodes, wherein the second transaction implements an uncommitted change to the first database instance at the database node of the multiple database nodes, and the first and second transactions are respectively executed on the first and the second database nodes at least by sharing the persistent memory in the remote storage appliance for respective commits of respective first and the second transactions.

19. The computer program product of claim 17, wherein the commit is initiated after the first transaction implements an uncommitted change to the first database on the database node, the remote storage appliance comprises the persistent memory and the persistent storage that includes one or more storage devices, and a remote direct memory access (RDMA) operation is used to store at least the log data to the persistent memory.

20. The computer program product of claim 19, wherein the log data is stored at the persistent memory with the one-sided RDMA protocol that comprises a one-sided RDMA protocol where no response is required from the remote storage appliance.

21. The computer program product of claim 17, wherein a zero-copy operation is implemented to store the log data at the persistent memory while bypassing a CPU at the remote storage appliance.

22. The computer program product of claim 17, wherein the set of acts further comprises:

after moving the log data for the first transaction to the persistent storage within the remote storage appliance, removing the log data for the first transaction from the persistent memory, wherein the log data is stored at the persistent memory and committed upon a successful remote direct memory access (RDMA) send operation by the database node.

23. The computer program product of claim 17, wherein the first transaction is committed prior to the log data being stored in a persistent storage device, the request is a one-sided request sent via the one-sided protocol, the first database sends the request without waiting for the acknowledgement from the remote storage appliance, and the database node of the multiple database nodes includes one or more database processes to operate over the first database at the database node.

24. The computer program product of claim 17, wherein the log data in the persistent memory is transferred to a persistent storage device at the remote storage appliance, and the log data is removed from the persistent memory.

25. A computer program product embodied on a non-transitory computer readable medium, the non-transitory computer readable medium having stored thereon a sequence of instructions which, when executed by a processor, causes the processor to perform a set of acts, the set of acts comprising:

executing operations for a transaction in a database at a database node of multiple database nodes, wherein a database node of the multiple database nodes comprises the database, the multiple database nodes share use of a persistent memory in a storage tier of a remote computing device to hold log records for the transaction, wherein the storage tier of the remote computing device is connected to and shared by the multiple database nodes over a network so that each database node of the multiple database nodes shares the persistent memory for a respective commits of respective transactions executing on respective database nodes;

generating log data for the operations at the database;

initiating a commit of the transaction;

sending the log data together with a request to write the at least the log data to the persistent memory in the storage tier of the remote computing device; and committing the transaction after a successful send message, by the database node, for successfully sending the request together with the log data for the transaction sent using a one-sided protocol is received, without the database node waiting for acknowledgment from the persistent memory.

26. The computer program product of claim 25, wherein the transaction is committed after receipt of the successful send message and prior to the log data being stored in a persistent storage device, the request is a one-sided request sent via the one-sided protocol, where the database sends the request without waiting for the acknowledgement from the remote computing device, and a RDMA (remote direct memory access) operation is used to store the log data to the persistent memory.

27. The method of claim 1, wherein the remote storage appliance is connected to and shared by the multiple database nodes over a network so that each database node of the multiple database nodes shares the persistent memory for respective fast commits of respective transactions.

28. The method of claim 2, wherein the first and second transactions are respectively executed on the first and the second database nodes at least by sharing the persistent memory in the remote storage appliance for respective fast commits of respective first and second transactions.

29. The system of claim 7, wherein the remote storage appliance is connected to and shared by the multiple database nodes over a network so that each database node of the multiple database nodes shares the persistent memory for respective fast commits of respective transactions.

30. The system of claim 8, wherein the first and second transactions are respectively executed on the first and the second database nodes at least by sharing the persistent memory in the remote storage appliance for respective fast commits of respective first and second transactions.

31. The computer program product of claim 17, wherein the remote storage appliance is connected to and shared by the multiple database nodes over a network so that each database node of the multiple database nodes shares the persistent memory for respective fast commits of respective transactions.

32. The computer program product of claim 18, wherein the first and second transactions are respectively executed on the first and the second database nodes at least by sharing the persistent memory in the remote storage appliance for respective fast commits of respective first and second transactions.

33. The computer program product of claim 25, wherein the remote storage appliance is connected to and shared by the multiple database nodes over a network so that each database node of the multiple database nodes shares the persistent memory for respective fast commits of respective transactions.

* * * * *